(12) United States Patent
Tokuma et al.

(10) Patent No.: US 11,496,641 B2
(45) Date of Patent: Nov. 8, 2022

(54) IMAGE READING APPARATUS AND IMAGE FORMING APPARATUS

(71) Applicant: CANON KABUSHIKI KAISHA, Tokyo (JP)

(72) Inventors: Naoto Tokuma, Chiba (JP); Eikou Mori, Tokyo (JP); Akito Sekigawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/328,044

(22) Filed: May 24, 2021

(65) Prior Publication Data

US 2021/0377412 A1  Dec. 2, 2021

(30) Foreign Application Priority Data

May 29, 2020 (JP) .............................. JP2020-095101

(51) Int. Cl.
*H04N 1/00* (2006.01)
*G03G 15/22* (2006.01)

(52) U.S. Cl.
CPC ......... *H04N 1/00809* (2013.01); *G03G 15/22* (2013.01); *H04N 1/0066* (2013.01); *H04N 1/00602* (2013.01)

(58) Field of Classification Search
CPC ............... G03G 15/22; G03G 15/5062; G03G 2215/00616; H04N 1/00602; H04N 1/0066; H04N 2201/03112; H04N 2201/0312; H04N 2201/03125; H04N 2201/03129; H04N 2201/03141; H04N 2201/03145; H04N 5/2254; H04N 1/028; H04N 1/0318; H04N 1/48; H04N 2201/03187; H04N 5/225; H04N 5/2257; H04N 5/232; H04N 5/23248
USPC .................................................. 358/474, 498
See application file for complete search history.

(56) References Cited

U.S. PATENT DOCUMENTS

| | | | |
|---|---|---|---|
| 6,798,546 B1* | 9/2004 | Yamauchi | H04N 1/0473 399/365 |
| 8,059,976 B2* | 11/2011 | Matsui | G03G 15/6561 399/18 |
| 8,087,667 B2 | 1/2012 | Sekigawa | |
| 8,240,664 B2 | 8/2012 | Sekigawa | |
| 8,500,122 B2 | 8/2013 | Kushida et al. | |
| 8,550,461 B2 | 10/2013 | Sekigawa et al. | |
| 8,613,442 B2 | 12/2013 | Gamo et al. | |
| 8,752,837 B2 | 6/2014 | Iwata et al. | |
| 8,794,617 B2 | 8/2014 | Tokuma | |

(Continued)

*Primary Examiner* — Negussie Worku
(74) *Attorney, Agent, or Firm* — Venable LLP

(57) ABSTRACT

An image reading apparatus connectable to an image forming apparatus includes a feeding roller pair configured to nip and feed a sheet discharged from the image forming apparatus, a contact image sensor configured to read an image on a first surface of the sheet fed by the feeding roller pair, a light-transmissive plate provided opposed to the contact image sensor and having a light-transmission property, a first roller opposing the light-transmissive plate with a gap therebetween on a side opposite from the contact image sensor with respect to the light-transmissive plat, and a second roller positioned upstream of the first roller with respect to a sheet feeding direction and opposing the light-transmissive plate with a gap therebetween on the same side as the first roller.

15 Claims, 13 Drawing Sheets

(56) References Cited

U.S. PATENT DOCUMENTS

| | | | |
|---|---|---|---|
| 8,851,468 B2 | 10/2014 | Tokuma | |
| 9,033,330 B2 * | 5/2015 | Tokuma | B42C 1/12 270/58.11 |
| 9,067,753 B2 | 6/2015 | Tokuma et al. | |
| 9,102,497 B2 * | 8/2015 | Tokuma | B65H 31/34 |
| 9,665,055 B2 | 5/2017 | Sekigawa | |
| 9,696,648 B2 * | 7/2017 | Maehata | G03G 15/0216 |
| 9,738,469 B2 | 8/2017 | Sekigawa | |
| 9,890,011 B2 | 2/2018 | Tokuma | |
| 9,914,611 B2 | 3/2018 | Tokuma | |
| 9,932,194 B2 | 4/2018 | Tokuma | |
| 9,932,195 B2 | 4/2018 | Sekigawa | |
| 10,183,829 B2 | 1/2019 | Tokuma | |
| 10,294,059 B2 | 5/2019 | Tokuma | |
| 10,317,836 B2 | 6/2019 | Tokuma | |
| 10,782,639 B2 | 9/2020 | Tokuma et al. | |
| 10,981,738 B2 | 4/2021 | Sekigawa | |
| 11,365,076 B2 * | 6/2022 | Kondo | B65H 5/025 |
| 2004/0207887 A1 * | 10/2004 | Makino | H04N 1/00588 358/496 |
| 2012/0275839 A1 | 11/2012 | Kushida et al. | |
| 2012/0288310 A1 | 11/2012 | Kamiya et al. | |
| 2014/0030000 A1 | 1/2014 | Gamo et al. | |
| 2015/0123338 A1 * | 5/2015 | Iwata | B65H 29/70 270/58.08 |
| 2016/0286062 A1 | 9/2016 | Tomatsu | |
| 2016/0286063 A1 * | 9/2016 | Isokawa | G03G 15/5062 |
| 2017/0302814 A1 * | 10/2017 | Yamamoto | G03G 15/602 |
| 2018/0364395 A1 * | 12/2018 | Seo | H04N 5/2254 |
| 2019/0127167 A1 | 5/2019 | Mori | |
| 2020/0041946 A1 | 2/2020 | Sekigawa | |
| 2020/0247627 A1 | 8/2020 | Sekigawa et al. | |
| 2020/0387099 A1 | 12/2020 | Tokuma et al. | |
| 2021/0087004 A1 | 3/2021 | Koga et al. | |
| 2021/0165355 A1 * | 6/2021 | Yamazaki | G03G 15/5062 |
| 2021/0344808 A1 * | 11/2021 | Suzuki | H04N 1/00602 |
| 2021/0368052 A1 * | 11/2021 | Nagata | G03G 15/6529 |
| 2021/0377416 A1 * | 12/2021 | Sekigawa | H04N 1/00795 |

* cited by examiner (a)

EDIT SHEET LIBRARY

| SHEET NAME | S.L. (SUB) (mm) | S.L. (MAIN) (mm) | B.W. (g/m²) | SFC PRPTY | CLR |
|---|---|---|---|---|---|
| ABC RCYCL 1 | 210 | 297 | 75 | P.P. | WHT |
| ABC RCYCL 2 | 297 | 420 | 75 | P.P. | WHT |
| DEF EMBSS A-1 | 216 | 279 | 150 | EMBSS | WHT |
| DEF CTD P-1 | 279 | 432 | 128 | D.S.CT | WHT |
| XYZ CLR 81 | 210 | 297 | 75 | P.P. | ORNG |
| XYZ CLR 82 | 210 | 297 | 75 | P.P. | PNK |

[ ADD ]  [ EDIT ]  [ DELETE ]  [ ADJUST ]

(b)

<ADJUSTMENT: SELECTION OF METHOD>

( ADJUST MANUARY )

( ADJUST BY READING TEST PAGE )

IMAGE READING APPARATUS AND IMAGE FORMING APPARATUS

FIELD OF THE INVENTION AND RELATED ART

The present invention relates to an image reading apparatus for reading an image on a sheet discharged from an image forming apparatus and relates to the image forming apparatus.

Conventionally, an image forming system including an image forming apparatus for forming an image on a sheet and an image reading apparatus for reading the image, formed on the sheet by the image forming apparatus, by a line sensor has been disclosed (U.S. Patent Application Publication No. US2016/0286063). This image forming system reads an image formed on front and back surfaces of the sheet by a reading apparatus and performs a correcting process of an image forming position in the image forming apparatus on the basis of a reading result.

In general, in the image reading apparatus for optically reading the image on the sheet, when the image on the sheet in a state in which a warpage (curl) of the sheet occurs, it is difficult to obtain good reading accuracy.

SUMMARY OF THE INVENTION

A principal object of the present invention is to provide an image reading apparatus and an image forming system which are capable of improving reading accuracy of an image.

According to an aspect of the present invention, there is provided an image reading apparatus connectable to an image forming apparatus, comprising: a feeding roller pair configured to nip and feed a sheet discharged from the image forming apparatus; a contact image sensor configured to read an image on a first surface of the sheet fed by the feeding roller pair; a light-transmissive plate provided opposed to the contact image sensor and having a light-transmission property; a first roller opposing the light-transmissive plate with a gap therebetween on a side opposite from the contact image sensor with respect to the light-transmissive plate; and a second roller positioned upstream of the first roller with respect to a sheet feeding direction and opposing the light-transmissive plate with a gap therebetween on the same side as the first roller.

Further features of the present invention will become apparent from the following description of exemplary embodiments with reference to the attached drawings.

Figure 4:
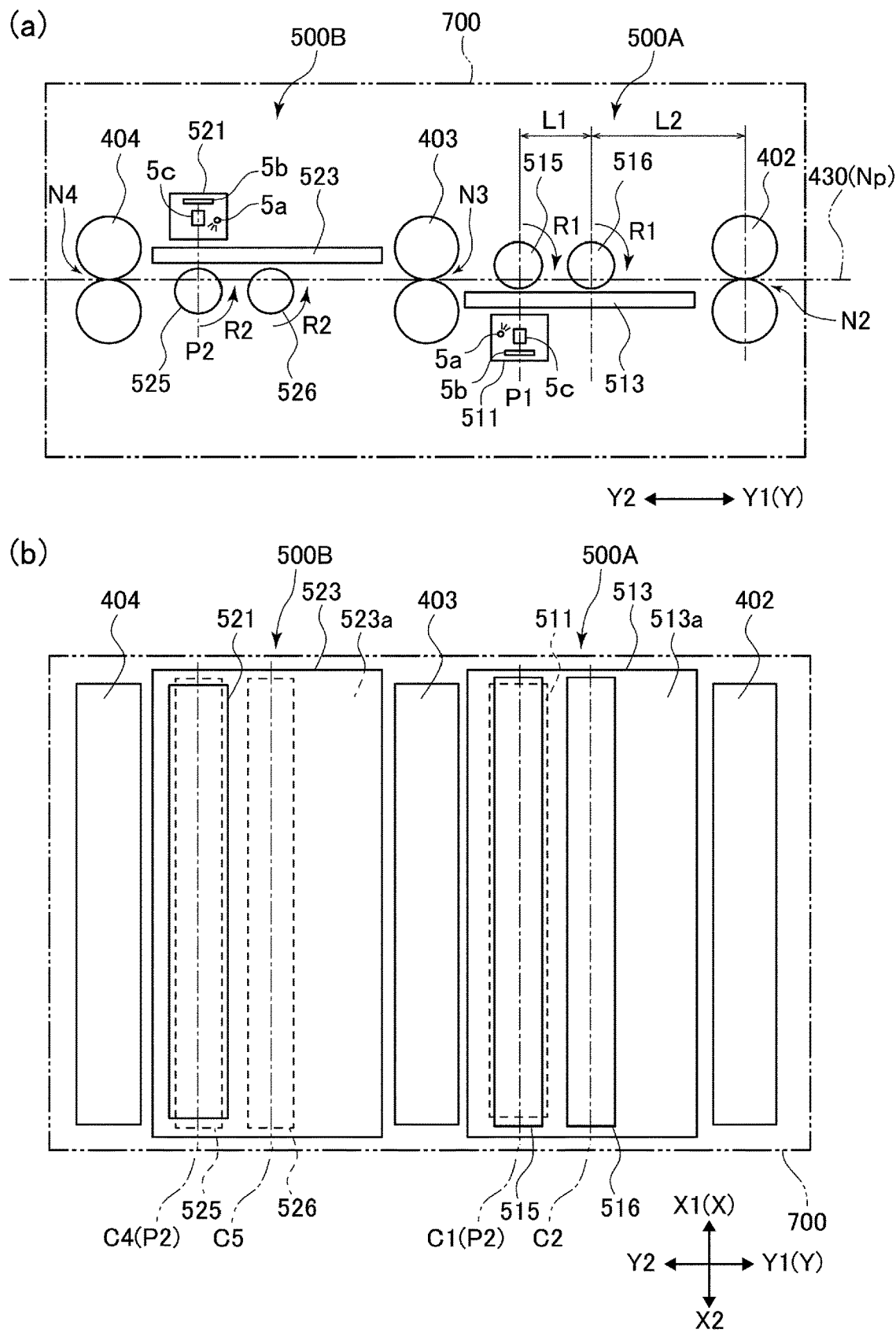

Part (a) of FIG. 4 is a side view showing a general structure of a front and back registering portion, and part (b) of FIG. 4 is a top (plan) view showing the general structure of the front and rear registering portion.

Part (a) of FIG. 5 is a schematic view showing a display screen of a sheet library, and part (b) of FIG. 5 is a schematic view showing a selection screen of a correcting method of a geometric adjusting value.

Figure 6:
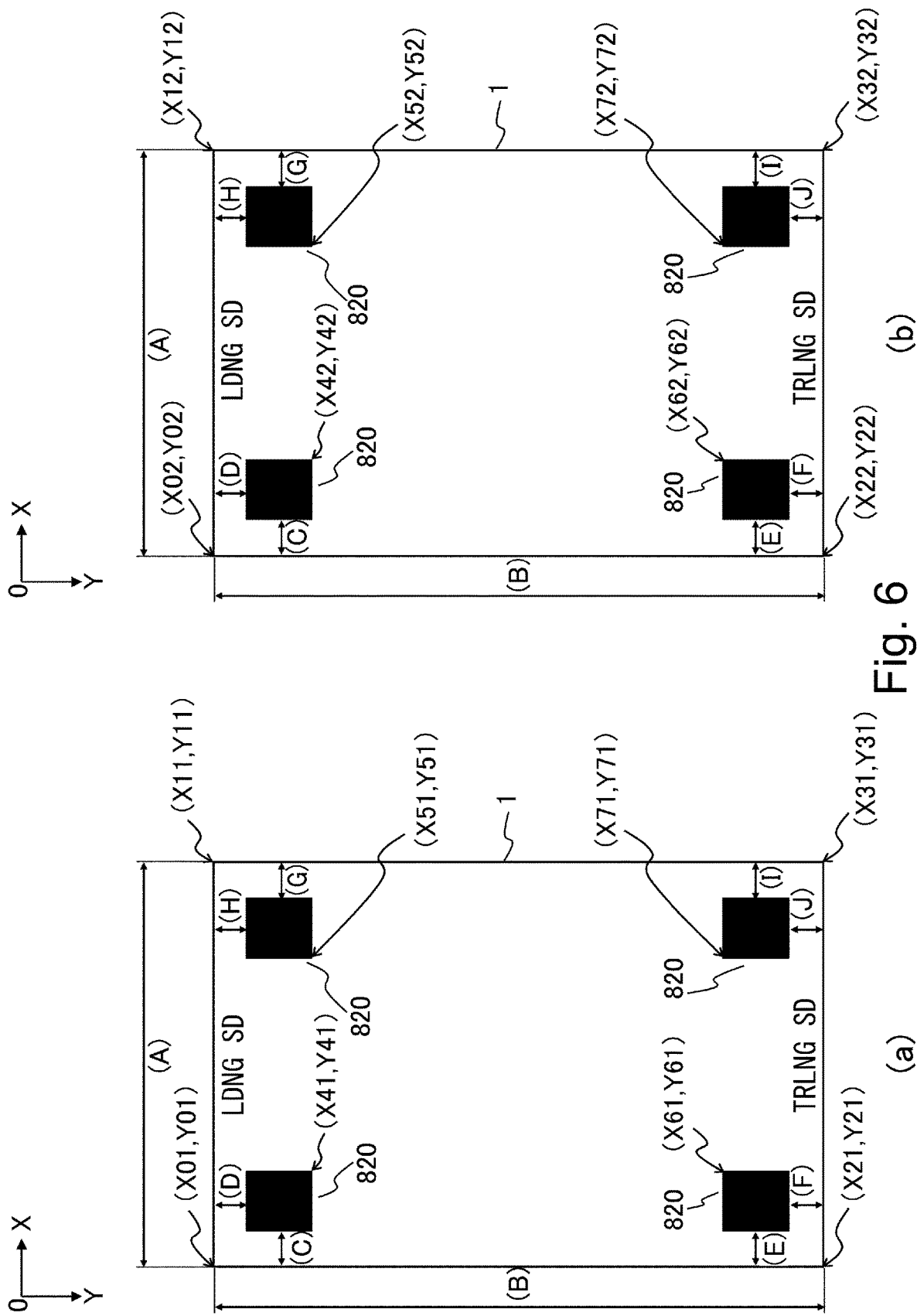

Part (a) of FIG. 6 is a schematic view showing a test pattern for front and back registration formed on a front surface of a sheet, and part (b) of FIG. 6 is a schematic view showing a test pattern for front and back registration formed on a back surface of the sheet.

Figure 7:
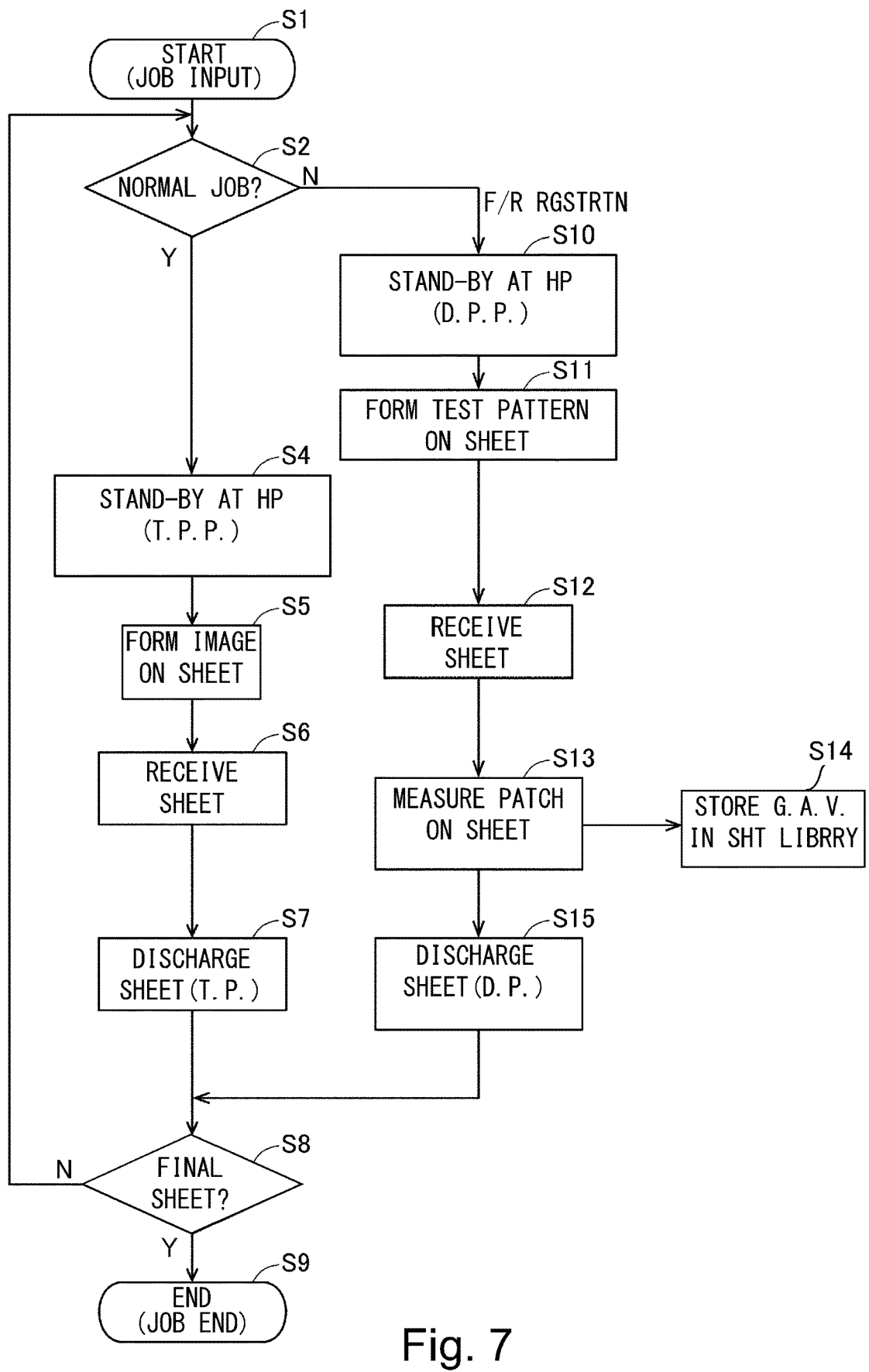

FIG. 7 is a flowchart showing a control example of the image forming system.

Figure 8:
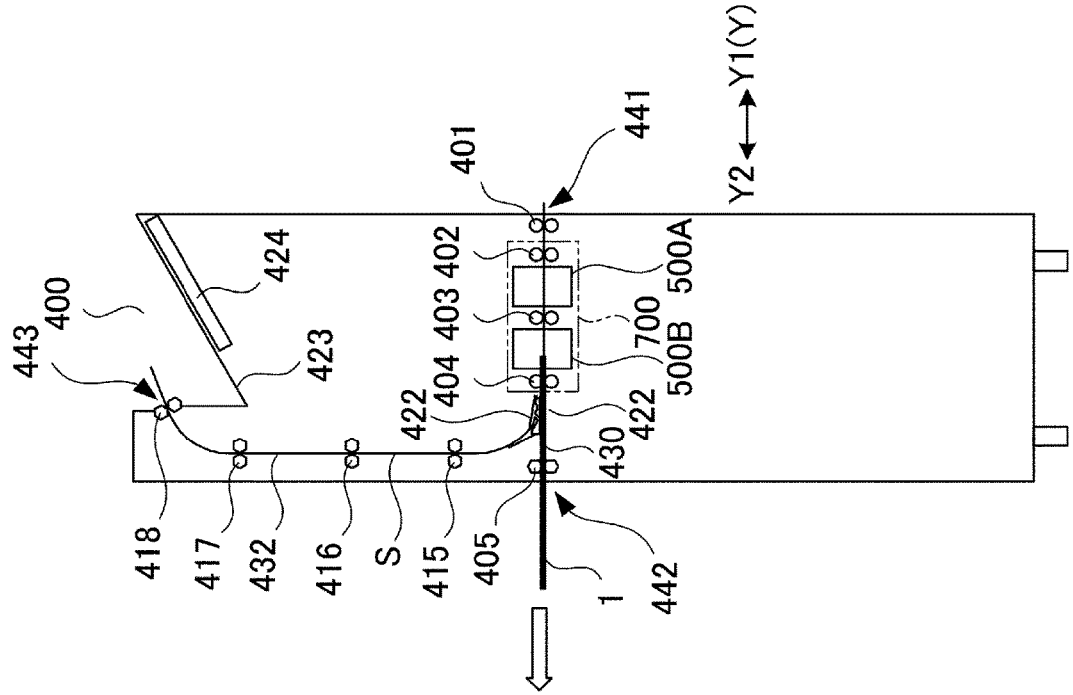
Figure 8:
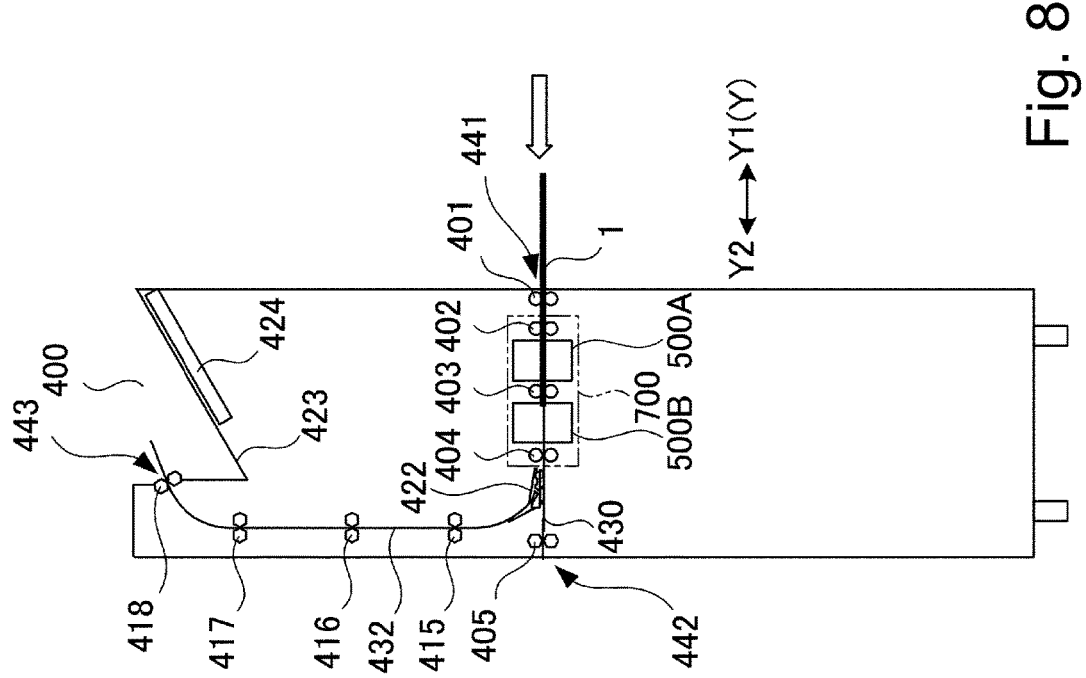

Parts (a) and (b) of FIG. 8 are schematic views for illustrating a sheet feeding operation in a normal job, in which different states are shown, respectively.

Figure 9:
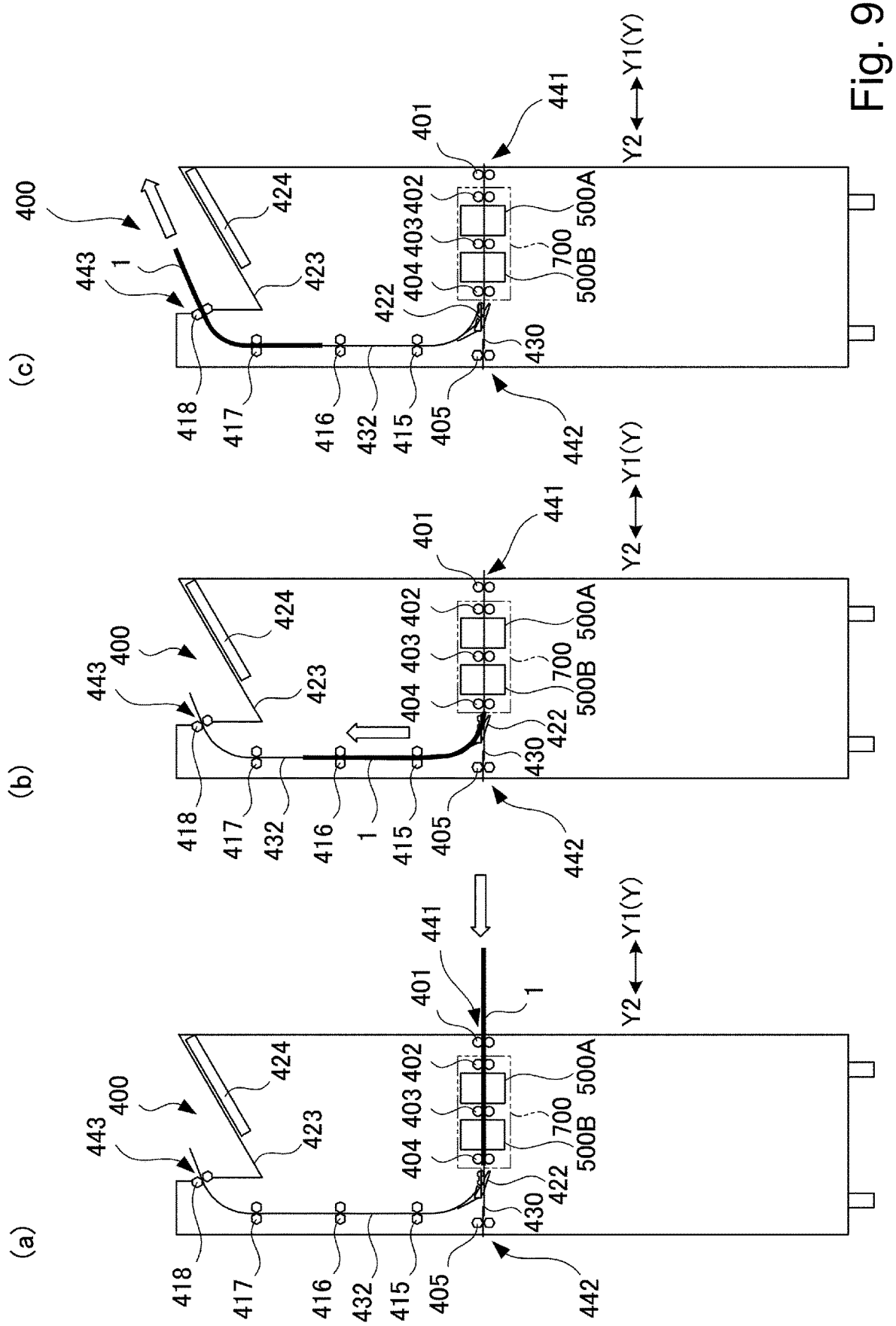

Parts (a) to (c) of FIG. 9 are schematic views for illustrating a sheet feeding operation in a front and back registration job, in which different states are shown, respectively.

Figure 10:
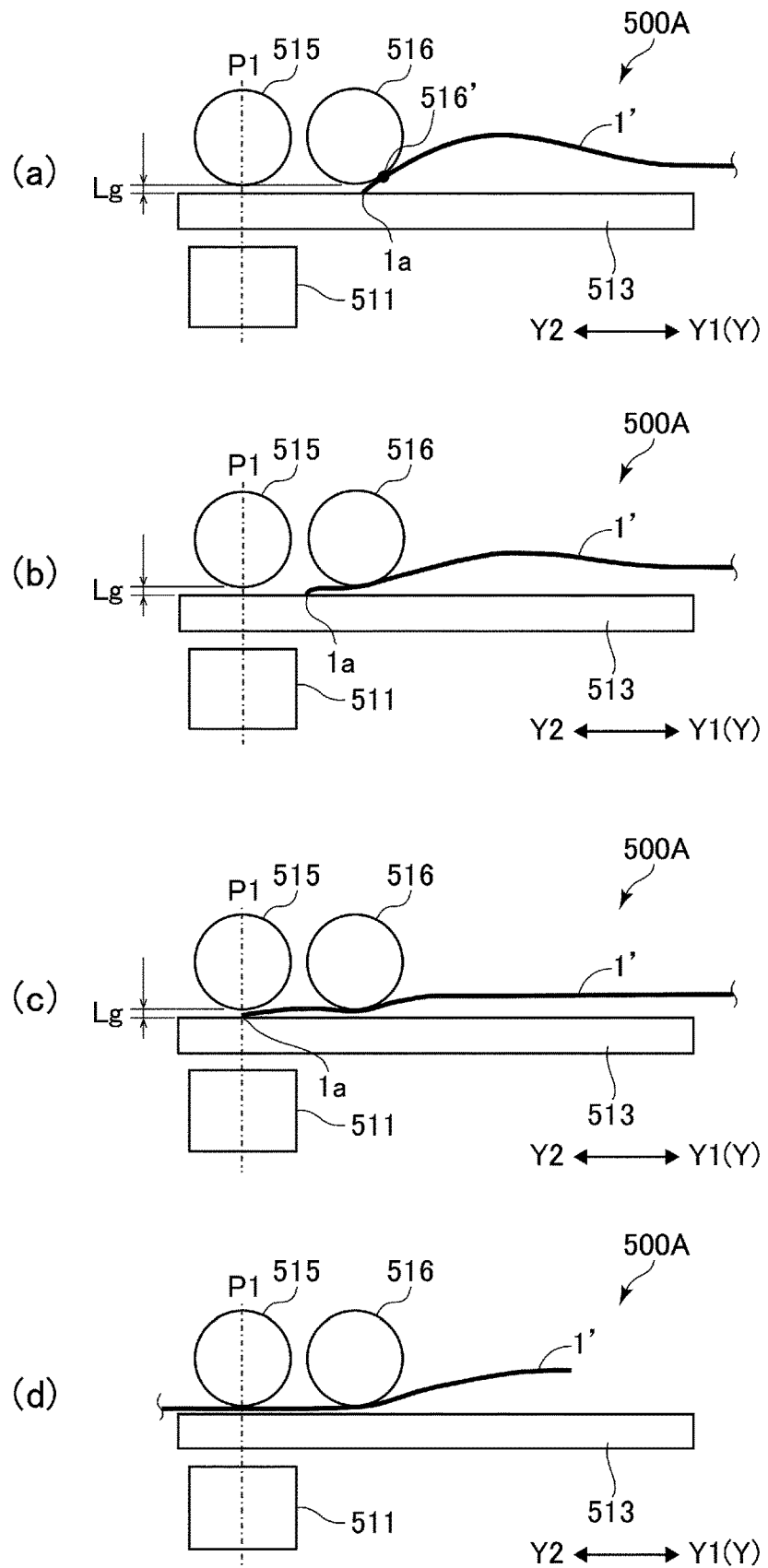

Parts (a) to (d) of FIG. 10 are schematic views each showing a first reading portion, in which states different from each other are shown.

Figure 11:
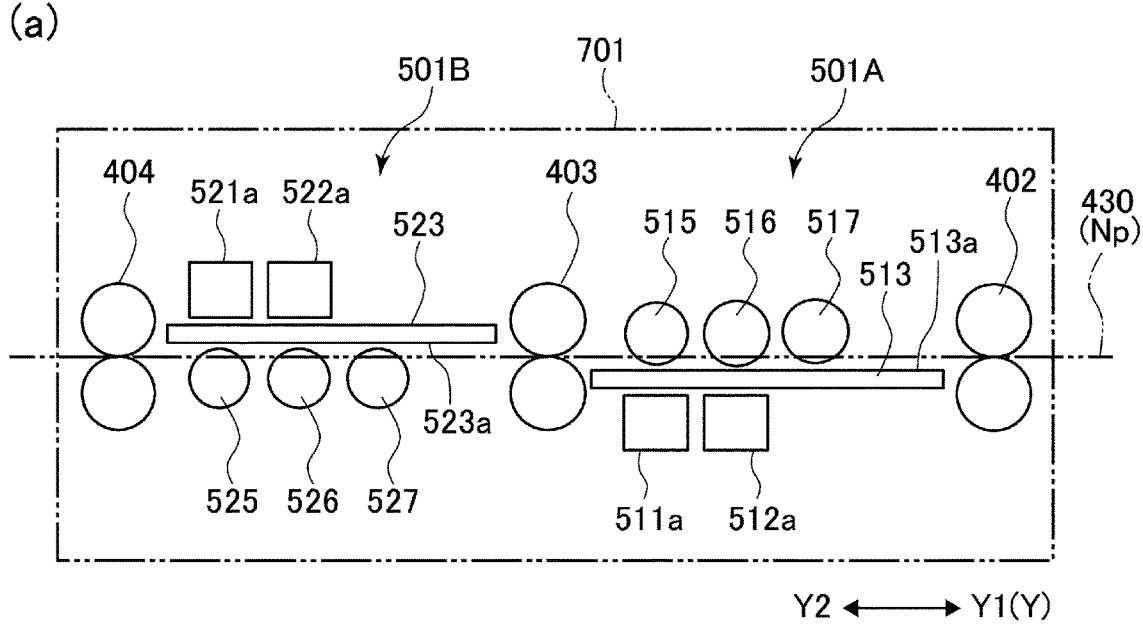
Figure 11:
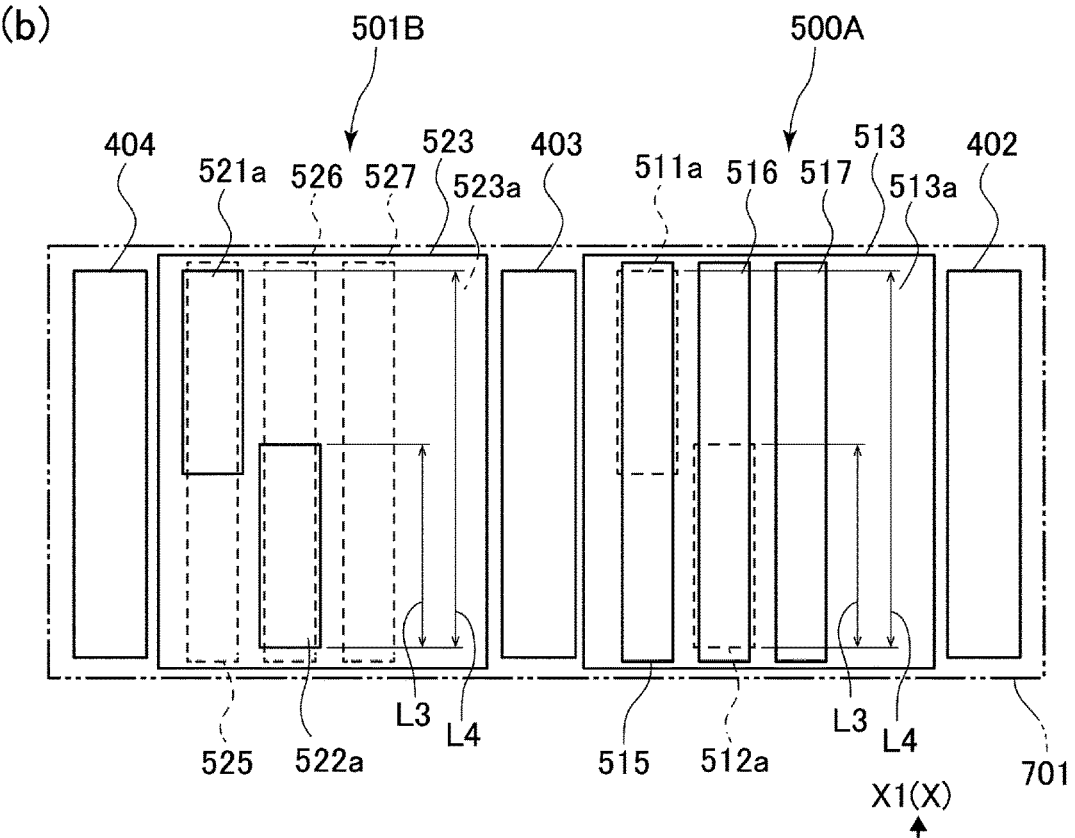

Parts (a) and (b) of FIG. 11 are a side view and a top view, respectively, showing a general structure of a front and rear registering portion in a second embodiment.

Figure 12:
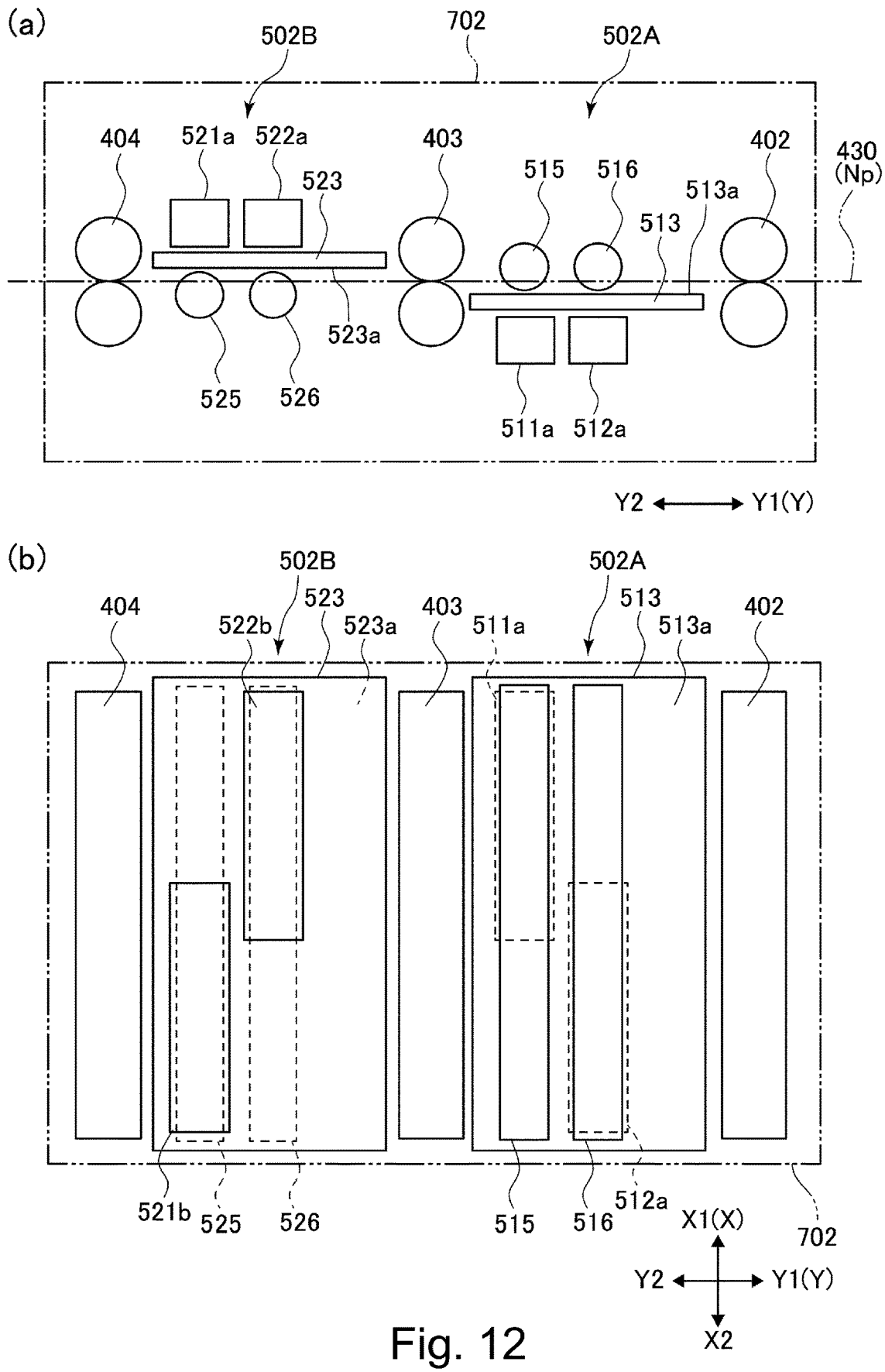

Parts (a) and (b) of FIG. 12 are a side view and a top view, respectively, showing a general structure of a front and rear registering portion in a third embodiment.

Figure 13:
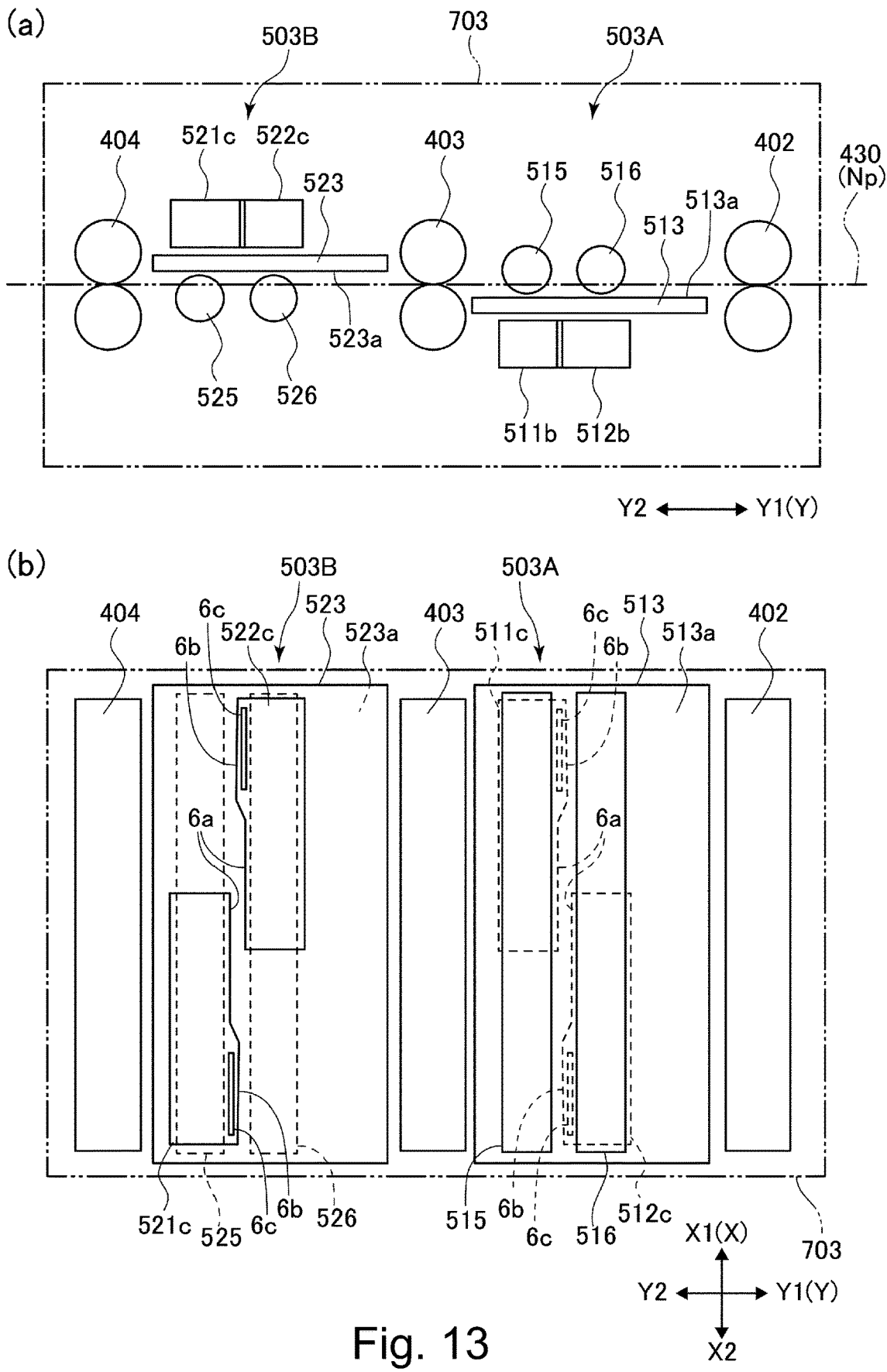

Parts (a) and (b) of FIG. 13 are a side view and a top view, respectively, showing a general structure of a front and rear registering portion in a fourth embodiment.

DESCRIPTION OF THE EMBODIMENTS

In the following, an image reading apparatus and an image forming apparatus according to embodiments will be described while making reference to the drawings. As regards dimensions, materials, shapes and relative arrangement of constituent elements described in the following embodiments, an applied range of the present invention is not intended to be limited thereto unless otherwise specified.

First Embodiment

[General Structure of Image Forming System]

Figure 1:
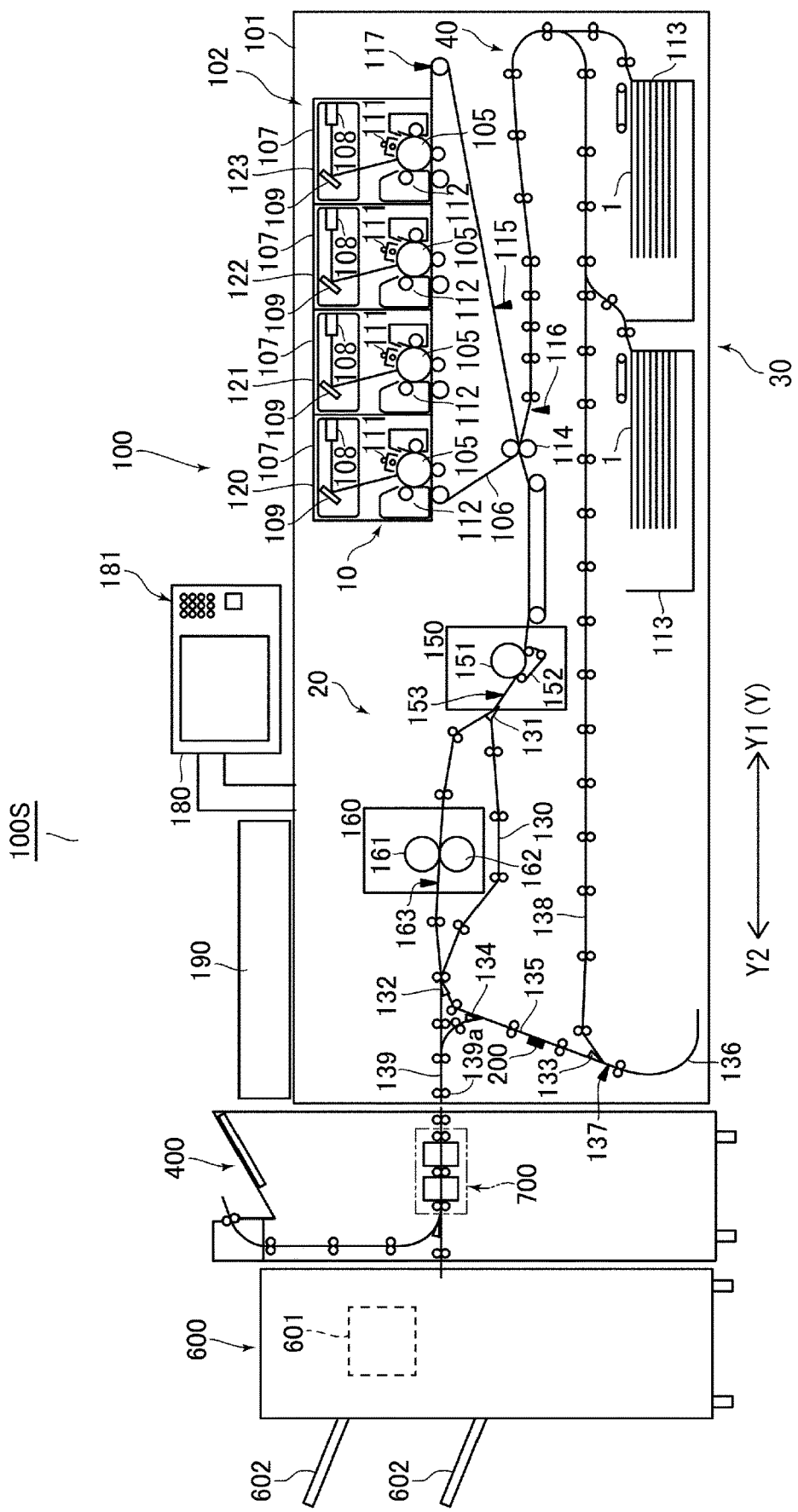
FIG. 1 is a schematic view of an image forming system according to a first embodiment of the present invention.

FIG. 1 is a schematic view showing an image forming system 100S according to an embodiment of the present invention. The image forming system 100S includes an image forming apparatus 100, an adjusting unit 400 and a finisher 600. In this embodiment, as the image forming apparatus, the image forming apparatus 100 which is a laser beam printer of an electrophotographic type will be described as an example, but the image forming apparatus is not limited thereto and may also be a printer of an ink jet type or a printer of a sublimation type. Further, the adjusting unit 400 is the image reading apparatus in this embodiment.

In a casing 101 of the image forming apparatus 100, an image forming engine 102 and a control board accommodating portion (not shown) for accommodating a printer controller 103 (FIG. 2) for controlling an operation of the image forming system 100S. The image forming engine 102 as an image forming portion includes an optical processing mechanism 10 for forming an image on a recording material by an image forming process, a fixing processing mechanism 20, and a feeding processing mechanism 30 and a conveying processing mechanism 40 which are used for feeding and conveying a rectangular sheet 1 used as the recording material, respectively. As the recording material, it is possible to use sheets including papers such as plain paper and thick paper, surface-treated papers such as coated paper and embossed paper, a plastic film, a cloth, and the like.

The optical processing mechanism 10 includes stations 120, 121, 122 and 123 for forming toner images of colors of yellow, magenta, cyan and black and includes an intermediary transfer belt 106. In each of the stations 120 to 123, a surface of a photosensitive drum 105 which is a drum-shaped photosensitive member is electrically charged by a primary charger 111. A laser scanner portion 107 performs an exposure process of the photosensitive drum 105 on the basis of an instruction signal which is formed on the basis of the image data and which is sent to the laser scanner portion 107. The laser scanner portion 107 includes a laser driver for turning on and off an unshown semiconductor laser to emit laser light. The laser scanner portion 107 guides the laser light from the semiconductor laser to the photosensitive drum 105 through a reflection mirror 109 while dividing the laser light into portions by a rotatable polygonal mirror with respect to a main scan direction (widthwise direction of the sheet). By this, on the surface of the photosensitive drum 105, an electrostatic latent image corresponding to the image data is formed.

A developing device 112 accommodates therein a developer containing toner and supplies charged toner particles to the photosensitive drum 105. The toner particles are deposited on the drum surface depending on a surface potential distribution, so that the electrostatic latent image carried on the photosensitive drum 105 is visualized as a toner image. The toner image carried on the photosensitive drum 105 is transferred (primary-transferred) onto the intermediary transfer belt 106 to which a voltage of a polarity opposite to a normal charge polarity of the toner is applied. In the case where a color image is formed, toner images formed by the four stations 120 to 123 are multiple-transferred onto the intermediary transfer belt 106 so as to be superposed on each other, so that a full-color toner image is formed on the intermediary transfer belt 106.

On the other hand, the feeding processing mechanism 30 feeds sheets 1 one by one toward a transfer roller 114 from a sheet accommodating portion 113 inserted into the casing 101 of the image forming apparatus 100 so as to be capable of being pulled out. The toner image carried on the intermediary transfer belt 106 which is an intermediary transfer member is transferred (secondary-transferred) onto the sheet 1 by the transfer roller 114.

Around the intermediary transfer belt 106, an image formation start position detecting sensor 115 for determining a print start position when the image formation is carried out, a feeding timing sensor 116 for timing feeding of the sheet 1, and a density sensor 117 are provided. The density sensor 117 measures a density of a patch image for a test carried on the intermediary transfer belt 106. The printer controller 103 adjusts an operation condition (for example, setting of a target charging potential of the primary charger 111 and a bias voltage of the developing provided 112) of the optical processing mechanism 10 on the basis of a detection result of the density sensor 117.

The fixing processing mechanism 20 in this embodiment is constituted by a first fixing device 150 and a second fixing device 160. The first fixing device 150 includes a fixing roller 151 for applying heat to the sheet 1, a pressing belt 152 for causing the sheet 1 to press-contact the fixing roller 151, and a first post-fixing sensor 153 for detecting completion of a fixing process by the first fixing device 150. The fixing roller 151 is a hollow roller and includes therein a heater. The first fixing device 150 applies heat and pressure to the toner image on the sheet 1 while nipping and feeding the sheet 1 by the fixing roller 151 and the pressing belt 152 which constitute a rotatable member pair. By this, the toner particles are melted and then is stuck, so that an image is fixed on the sheet 1.

The second fixing device 160 is disposed downstream of the first fixing device 150 in a feeding passage of the sheet 1. The second fixing device 160 has a function of enhancing glossiness of the image fixed on the sheet 1 by the first fixing device 150 and of ensuring a fixing property of the image on the sheet 1. Similarly as the first fixing device 150, the second fixing device 160 includes a fixing roller 161 and a pressing roller 162 as a rotatable member pair for heating and pressing the image on the sheet 1 while feeding the sheet 1, and a second post-fixing sensor 163 for detecting completion of a fixing process by the second fixing device 160.

Incidentally, depending on a kind of the sheet 1, there is no need to pass the sheet 1 through the second fixing device 160 in some instances. In such a case, the image forming apparatus 100 includes a circumventing feeding passage 130 for discharging the sheet 1 without via the second fixing device 160 for the purpose of reducing energy consumption. The sheet 1 sent from the first fixing device 150 is derived to either one of the second fixing device 160 and the circumventing feeding passage 130 by a first switching flapper 131.

The sheet 1 passed through the second fixing device 160 or the circumventing feeding passage 130 is derived to either one of discharge feeding passage 139 and a reverse feeding passage 135 by a second switching flapper 132. The sheet 1 fed to the reverse feeding passage 135 is then subjected to detection of a position thereof by a reverse sensor 137, so that a downstream end (leading end) and an upstream end (trailing end) of the sheet 1 with respect to a sub-scan direction (sheet feeding direction) are changed to each other by a switch-back operation performed by reversing portion 136. In the case of double-side printing, the sheet 1 on which the image is formed on a front surface (second surface) thereof is fed toward the transfer roller 114 again via a re-feeding passage 138 in a state in which the reading end and the trailing end of the sheet 1 are changed to each other by the reversing portion 136, and then an image is formed on a back surface (first surface) of the sheet 1 opposite from the front surface of the sheet 1.

The sheet 1 on which image formation of one-side printing is ended or the sheet 1 on which image formation on the back surface of the sheet 1 in the double-side printing is discharged to an outside of the image forming apparatus 100 by a discharging roller 139a (discharging portion) provided in the discharge feeding passage 139. Incidentally, between the reverse feeding passage 135 and the discharge feeding passage 139, a switching flapper 134 capable of guiding the sheet 1, switched back by the reversing portion 136, toward the discharge feeding passage 139 is provided and is constituted so that the front surface and the back surface of the sheet 1 when the sheet 1 is discharged from the image forming apparatus 100 are selectable. Incidentally, at an upper portion of the image forming apparatus 100, an image reading apparatus 190 for reading image information from an original is provided.

Figure 2:
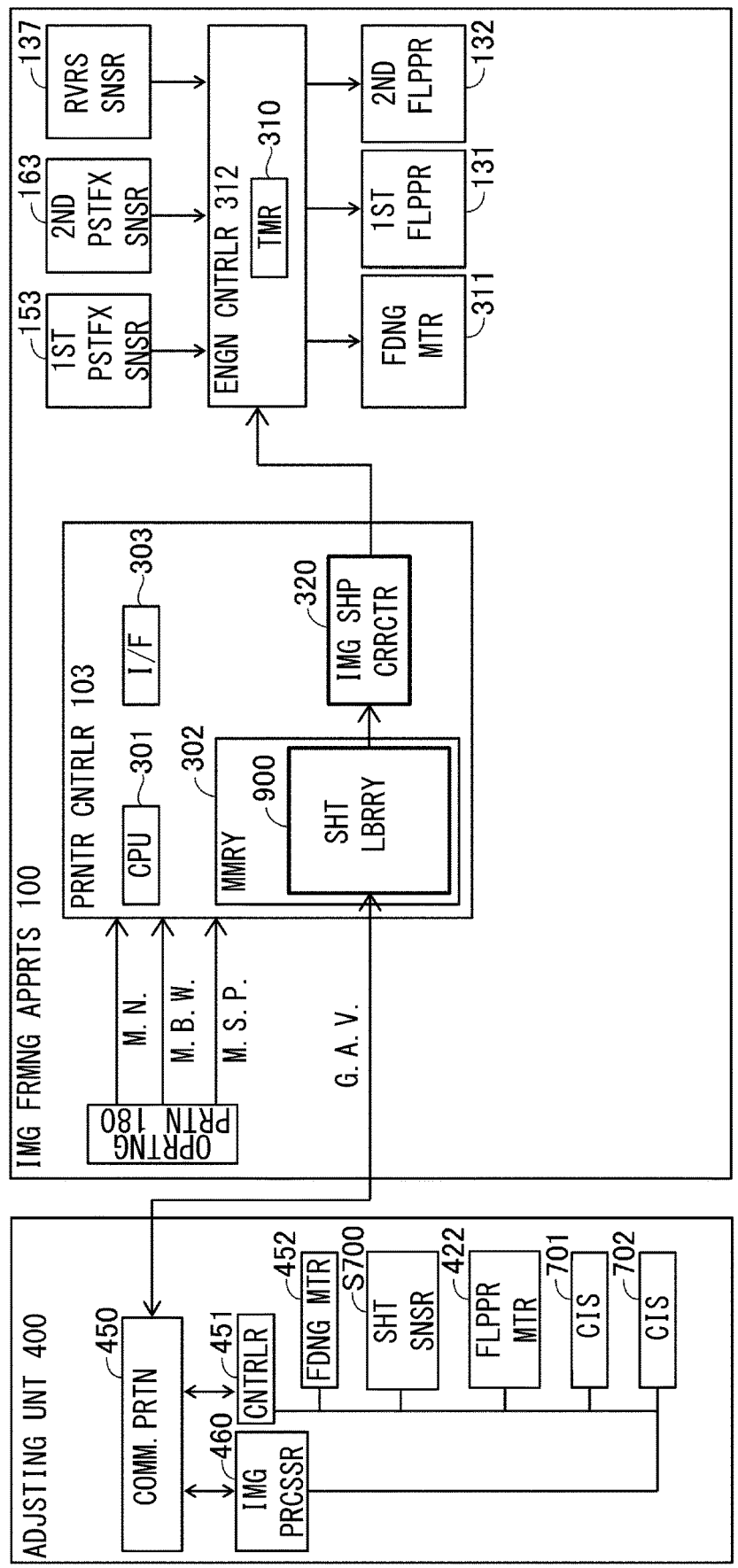
FIG. 2 is a block diagram showing a control constitution of the image forming system.

As shown in FIG. 2, the image forming apparatus 100 includes the printer controller 103 as a control means for carrying out integrated control of the operation of the image forming system 100S (FIG. 1) and an engine controller 312 for controlling the image forming engine 102 (FIG. 1). The printer controller 103 is a control board on which at least one processor (hereinafter referred to as CPU) 301, a memory 302 and an external interface (I/F) 303 are mounted. The memory 302 contains a transient storing medium and a non-transient storing medium, and is not only a storage place of a program and data but also an operating space when the CPU 301 executes the program.

The engine controller 312 causes the image forming engine 102 to perform the above-described image forming process on the basis of an instruction signal or the like from the printer controller 103, so that the image is formed on the sheet 1. For example, the engine controller 312 controls operations of a feeding motor 311 for driving the rollers for feeding the sheet 1 and the first switching flapper 131 and the second switching flapper 132 on the basis of detection signals of the first post-fixing sensor 153, the second post-fixing sensor 163 and the reverse sensor 137.

The image forming apparatus 100 is provided with an operating portion 180 (FIG. 1) which is a user interface of the image forming system 100S. The operating portion 180 includes a display as a display means for displaying information to the user. Further, the operating portion 180 is provided with, for example, physical keys such as numeric keys and a print execution button and the like, and a touch panel function of the display as an input means capable of inputting instructions and data from the user to the image forming system 100S. By the operation of the operating portion 180, the user is capable of inputting pieces of information indicating sheet attributes such as a name, a basis weight and the presence or absence of surface treatment of the sheet 1 set in the sheet accommodating portion 113 (FIG. 1), to the printer controller 103. The inputted attributes are registered in a sheet library 900 stored in the memory 302.

The printer controller 103 is connected to an external wired or wireless communication network via the external interface (I/F) 303 and is communicatable between itself and an external computer (not shown). Further, the printer controller 103 is also connected to control circuits of devices (the adjusting unit 400 and the finisher 600 in this embodiment) which are connected to the image forming apparatus 100 and which constitute the image forming system 100S. The printer controller 103 carries out communication with these devices and causes the image forming apparatus 100 and the other devices to be cooperated with each other.

[General Structure of Adjusting Unit]

Next, a general structure of the adjusting unit 400 which is the image reading apparatus shown in FIG. 1 and which is connectable to the image forming apparatus 100 will be described. In general, the image forming apparatus 100 of a print type, such as an electrophotographic type or an ink jet type, in which the image is formed on a cut sheet carries out the image formation on a one-edge basis of a rectangular sheet. For this reason, positional accuracy between a contour (outer edge) of the sheet and an image formed on the sheet and a relative positional accuracy between the image on the front surface of the sheet and the image on the back surface of the sheet, i.e., so-called front and back registration accuracy is largely influenced by cut accuracy (length, width, perpendicularity and parallelism) of the sheet in general.

The image forming system S in this embodiment perform adjustment of a relative position between the image on the front surface of the sheet and the image on the front surface of the sheet and the image on the back surface of the sheet (i.e., front and back registration) by adjusting the position of the image relative to a contour of the sheet and magnification of the image or the like. Specifically, when the image forming system 100S performs the front and back registration, first, by the image forming apparatus 100, a test pattern 820 (parts (a) and (b) of FIG. 6) is formed on the front surface and the back surface of the sheet. For example, the test pattern 820 includes a plurality of rectangular images (patch images) formed in the neighborhood of an outer edge of the sheet.

Thereafter, the adjusting unit 400 reads the test pattern (image information) 820 of the sheet and the contour of the sheet, and then sends (feeds back) information, based on a read result, to the image forming apparatus 100. The image forming apparatus 100 performs the front and back registration on the basis of the information received from the adjusting unit 400. By performing such front and back registration, the image forming system 100S of this embodiment is capable of improving the front and back registration accuracy even when there is a variation in cutting of the sheet.

In such an image forming system 100S of this embodiment, the adjusting unit 400 is provided between the image forming apparatus 100 and the finisher 600 with respect to a horizontal direction (left-right direction, Y-direction). That is, an upstream device of the adjusting unit 400 in this embodiment is the image forming apparatus 100, and a downstream device of the adjusting unit 400 is the finisher 600. The finisher 600 includes a processing portion 601 for subjecting the sheet to a marginal cutting process, a binding process, a saddle process and the like process, and discharges the processed sheet or sheet bundle (or the sheet received form the upstream device in the case where there is no need to perform the processes) as a product of the image forming system 100S.

Incidentally, the upstream device and the downstream device of the adjusting unit 400 change depending on a constitution of the image forming system 100S. For example, the adjusting unit 400 is not always directly connected to the image forming apparatus 100, but a constitution in which an intermediary unit is provided between the image forming apparatus 100 and the adjusting unit 400 and in which the adjusting unit 400 receives the sheet from the intermediary unit may also be employed. As an example of the intermediary unit, it is possible to cite a device for performing coating such that transparent toner is deposited on an image surface of the image-formed sheet and thus glossiness is imparted to the image, a cooling device for cooling the sheet, and the like device. Further, in some cases, a sheet processing device other than the finisher 600 is connected to the adjusting unit 400 on a side downstream of the adjusting unit 400. As an example of such a sheet processing device, it is possible to cite an inserter for inserting a sheet as a cover into the sheet bundle and a stacker movable by a hard cart in a state in which a large volume of products are accommodated.

Figure 3:
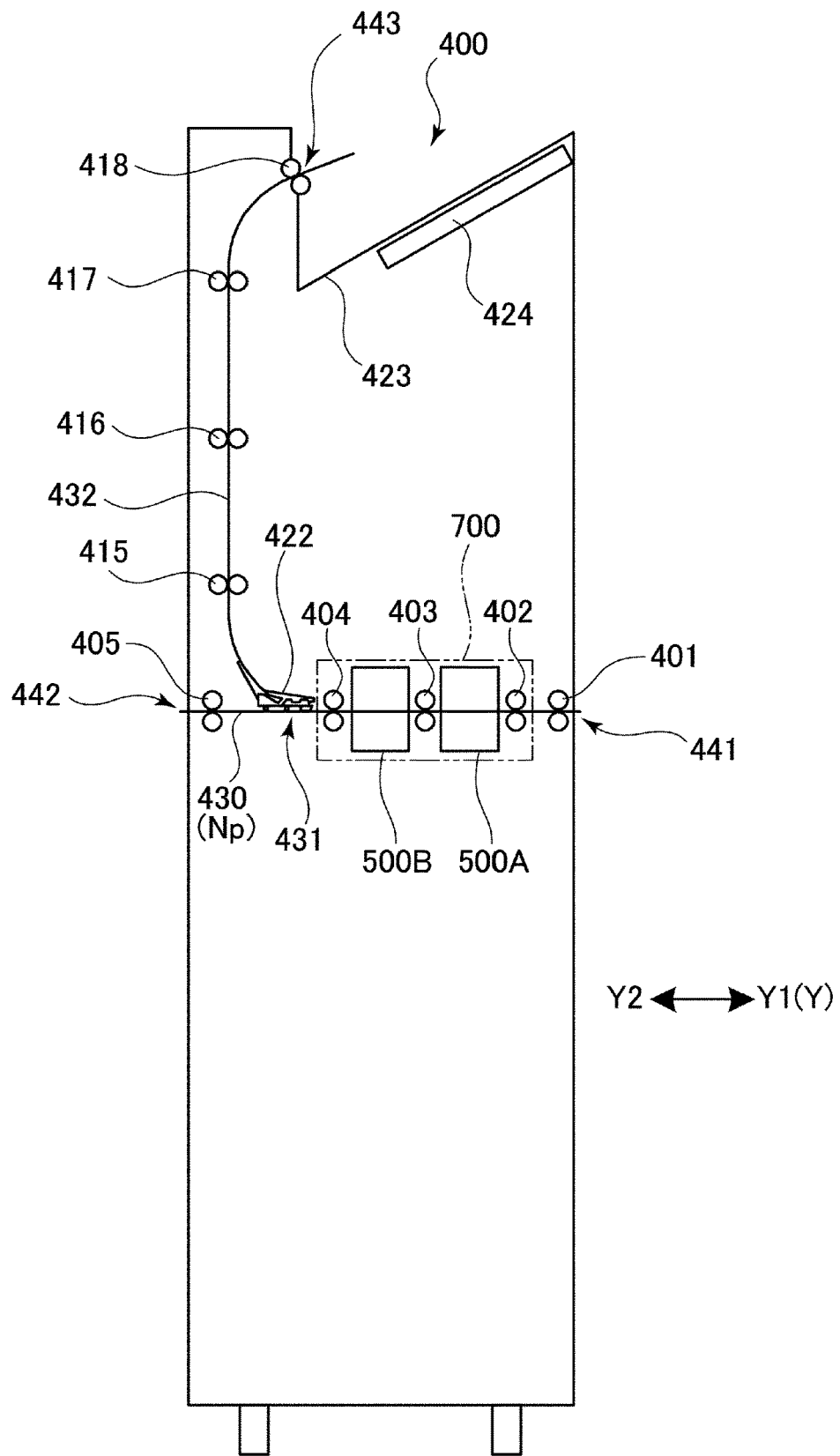
FIG. 3 is a schematic view of an adjusting unit.

As shown in FIG. 3, the adjusting unit 400 is provided with a receiving opening 441 for permitting reception of the sheet, discharged from the image forming apparatus 100, into the adjusting unit 400 and a first discharging opening 442 for permitting discharge of the sheet toward the finisher 600 (FIG. 1). Further, the adjusting unit 400 includes a through passage 430 formed so as to linearly connect the receiving opening 441 and the first discharging opening 442 along the substantially horizontal direction (Y-direction), and includes a discharging passage 432 branching upward from an intermediary portion of the through passage 430 and formed upward. Further, the adjusting unit 400 is provided with a second discharging opening 443 permitting discharge of the sheet, received through the receiving opening 441, to the outside of the adjusting unit 400 through the discharging passage 432, and a discharge tray 423 which is provided atom upper portion of the adjusting unit 400 and on which sheets discharged through the second discharging opening 443 are stacked. The through passage 430 is a first sheet feeding passage in this embodiment, the discharging passage 432 is a second in this embodiment, and the discharge tray 423 is a sheet stacking means in this embodiment.

The through passage 430 is provided with an inlet feeding roller pair 401, disposed so as to face the receiving opening 441, for feeding the sheet received through the receiving opening 441, toward an inside of the adjusting unit 400. Further, the through passage 430 is provided with an outlet feeding roller pair 405 for feeding the sheet toward the finisher 600 through the first discharging opening 442. Further, the through passage 430 is provided with a front and rear registering portion 700, provided between the inlet feeding roller pair 401 and the outlet feeding roller pair 405 with respect to a feeding direction (sheet feeding direction) Y2, for reading the sheet. The front and rear registering portion 700 is provided with a plurality of roller pairs along the through passage 430 and feeds the sheet toward the outlet feeding roller pair 405 in the feeding direction (sheet feeding direction) Y2 while nipping the sheet by the plurality of roller pairs.

Each of the inlet feeding roller pair 401 and the outlet feeding roller pair 405 is constituted by a pair of rollers (rotatable members) which is provided opposed to each other and which is rotated by a feeding motor 452 (FIG. 2) as a driving means. The inlet feeding roller pair 401 feeds the sheet, discharged from the image forming apparatus 100, toward the front and rear registering portion in the feeding direction (sheet feeding direction) Y2 along the through passage 430 while nipping the sheet. The outlet feeding roller pair 405 feeds and discharges, toward the finisher 600 along the through passage 430 through the first discharging opening 442, the sheet subjected to reading by the front and back registering portion 700 while nipping the sheet.

A branch portion 431 from the through passage 430 toward the discharging passage 432 is provided with a switching flapper 422 which is a guiding member capable of switching the sheet feeding passage between a downstream portion of the through passage 430 and the discharging passage 432. Further, the adjusting unit 400 is provided along the discharging passage 432 with feeding roller pairs 415, 416, 417 and 418 for feeding the sheet which are provided at a plurality of positions. These feeding roller pairs 415 and 418 feed the sheet toward the second discharging opening 443 along the discharging passage 432 and discharges the sheet onto the discharge tray 423 through the second discharging opening 443.

As shown in parts (a) and (b) of FIG. 4, the front and rear registering portion 700 includes an upstream feeding roller pair 402, an intermediary feeding roller pair 403 and a downstream feeding roller pair 404 which are provided along the through passage 430 and which feed the sheet in the feeding direction Y2 while nipping the sheet. Further, the front and back registering portion 700 includes a first reading portion 500A for reading a contour of the sheet and image information of a lower surface of the sheet and a second reading portion, 500B provided downstream of the first reading portion 500A with respect to the feeding direction Y2, for reading the contour of the sheet and image information of an upper surface of the sheet. Incidentally, the order of reading of the image information of the sheet is not limited thereto, but the reading portion for reading the image information of the lower surface may also be disposed downstream of the reading portion for reading the image information of the upper surface.

The upstream feeding roller pair 402 as a feeding roller pair is disposed between the inlet feeding roller pair 401 and the first reading portion 500A with respect to the feeding direction Y2. The intermediary feeding roller pair 403 is disposed between the first reading portion 500A and the second reading portion 500B with respect to the feeding direction Y2. The downstream feeding roller pair 404 is disposed between the second reading portion 500B and the outlet feeding roller pair 405 with respect to the feeding direction Y2.

Each of the upstream feeding roller pair 402, the intermediary feeding roller pair 403 and the downstream feeding roller pair 404 includes a pair of rollers (rotatable members) which are disposed opposed to each other along the main scan direction and which are rotatable about rotational axes. Incidentally, the main scan direction (widthwise direction of the sheet) is an X-direction shown in part (b) of FIG. 4.

Each of the upstream feeding roller pair 402, the intermediary feeding roller pair 403 and the downstream feeding roller pair 404 is driven by the feeding motor 452 (Figure). Further, the upstream feeding roller pair 402, the intermediary feeding roller pair 403 and the downstream feeding roller pair 404 form an upstream nip N2, an intermediary nip N3 and a downstream nip N4, respectively, in which the sheet is capable of being nipped.

The upstream feeding roller pair 402 feeds the sheet, fed by the inlet feeding roller pair 401, in the feeding direction Y2 while nipping the sheet in the upstream nip N2. The intermediary feeding roller pair 403 feeds the sheet, fed by the upstream feeding roller pair 402, in the feeding direction Y2 while nipping the sheet in the intermediary nip N3. The downstream feeding roller pair 404 feeds the sheet, fed by the intermediary feeding roller pair 403, in the feeding direction Y2 while nipping the sheet in the downstream nip N4.

Incidentally, each of the upstream feeding roller pair 402, the intermediary feeding roller pair 403 and the downstream feeding roller pair 404 may be constituted by a pair of rollers and may also be constituted by a plurality of roller pairs (rotatable member pairs) provided with gaps the between with respect to the main scan direction.

The first reading portion 500A includes a back surface CIS 511, as a first contact image sensor, a first transparent guide 513 as a first light-transmissive plate, a first guiding roller 515 as a first roller, and a second guiding roller 516 as a second roller.

The back surface CIS 511 is a contact image sensor disposed on side downstream of the upstream feeding roller pair 402 and below the through passage 430 with respect to the feeding direction Y2, i.e., on a lower surface (back surface, first surface) of the sheet fed along the through passage 430. Specifically, the back surface CIS 511 includes an LED array 7a as a light source, a sensor array 7b comprising an image pick-up element such as CMOS, and a lens array 7c for forming an image of reflected light, from the fed sheet, on the sensor array 7b. The lens array 7c comprises a plurality of lenses which are of a refractive index distribution type and which constitute the 1:1 optical system. The LED array 7a, the sensor array 7b and the lens array 7c are arranged along the main scan direction over an entire range in which the back surface CIS 511 is capable of reading the sheet with respect to the main scan direction. Incidentally, a length of a range (reading range) with respect to the main scan direction in which the back surface CIS 511 is capable of reading the sheet is not less than a width of the maximum size sheet feedable by the image forming apparatus 100 (adjusting unit 400).

The back surface CIS 511 which is thus constituted reads the contour and image information of the sheet, fed along the through passage 430 by the upstream feeding roller pair 402, from the lower surface of the sheet at a first reading position P1. Incidentally, the first reading position P1 is specifically an optical axis position of the lens array 7c for guiding reflected light of the LED array 7a from the lower surface of the sheet to the sensor array 7b of the back surface CIS 511.

In general, in order to realize front and rear registration with high accuracy, there is a need that reading of a plurality of sheets is carried out and then the front and rear registration is performed on the basis of an averaged result. In this embodiment, it becomes possible to carry out the reading of the sheet while feeding the sheet without moving the sensor with use of the contact image sensor, so that it is possible to shorten a time required for the reading of the sheet even in the case where the reading of the plurality of sheets is carried out. Further, by using the image sensor of the 1:1 optical system, it is possible to downsize the apparatus compared with a sensor of a reduction optical system (CCD or the like).

The first transparent guide 513 is formed of a material having a light-transmission property, for example, transparent glass or the like in a flat plate shape along the main scan direction and the sub-scan direction, and permits transmission of light emitted from the back surface CIS 511 and reflected light from the lower surface of the sheet. The first transparent guide 513 opposes the back surface CIS 511 and is disposed below the through passage 430. Further, the first transparent guide 513 includes an upstream end positioned downstream of the upstream feeding roller pair 402 and upstream of the second guiding roller 516 with respect to the feeding direction Y2. The first transparent guide 513 is thus constituted and guides the sheet in contact with the lower surface of the sheet fed along the through passage 430.

These first guiding roller 515 is disposed on a side above the through passage 430 so as to oppose the back surface CIS 511 while sandwiching the first transparent guide 513 therebetween. In other words, the guiding roller 515 opposes the back surface CIS 511 while sandwiching the first transparent guide 513 therebetween. Further, in other words, as shown in part (b) of FIG. 4, as seen in a direction (up-down direction) perpendicular to the surface of the sheet fed along the through passage 430, the first guiding roller 515 is disposed so as to overlap with the first reading position P1 and the feeding direction Y2.

This first guiding roller 515 is a rotatable member supported rotatably about a rotational axis C1 disposed along the main scan direction and is driven by the feeding motor 452 (FIG. 2) in order to reduce a friction resistance with the sheet, so that the first guiding roller 515 is rotated in an R1 direction of part (a) of FIG. 4. Further, this first guiding roller 515 constitutes a background when the back surface CIS 511 reads the contour of the sheet. For this reason, the first guiding roller 515 is formed along the main scan direction over an entire range, in which the back surface CIS 511 is capable of reading the sheet with respect to the main scan direction, by a rubber or the like of a color low in brightness, such as black or gray, so as to clarify a contrast with the sheet.

The second guiding roller 516 is disposed above the through passage 430 on a side upstream of the first guiding roller 515 with respect to the feeding direction Y2. This second guiding roller 516 is a rotatable member supported rotatably about a rotational axis C2 disposed along the main scan direction and is driven by the feeding motor 452 for reducing the friction resistance with the sheet, so that the second guiding roller 516 is rotated in the R1 direction. The first guiding roller 515 and the second guiding roller 516 which are constituted as described above guide the sheet in contact with the upper surface of the sheet fed along the through passage 430.

The first guiding roller 515 and the second guiding roller 516 oppose the first transparent guide 513 with a predetermined gap therebetween in which the fed sheet is capable of passing. For example, each of the first guiding roller 515 and the second guiding roller 516 is disposed so that a distance Lg from the first transparent guide 513 is not less than a thickness of a maximum thickness sheet feedable by the image forming apparatus 100 (adjusting unit 400). Further, for example, each of the first guiding roller 515 and the second guiding roller 516 are disposed so that the distance Lg from the first transparent guide 513 is not more than three times the thickness of the maximum thickness sheet. Specifically, in the case where the thickness of the maximum thickness sheet is 0.35 mm, the distance Lg is 0.35 mm or more and 1.05 mm or less.

For this reason, the sheet fed along the through passage 430 is not nipped at the first reading position P1 between the first guiding roller 515 and the first transparent guide 513, so that a position of the sheet with respect to a thickness direction is restricted. By this, generation of abrasion powder due to friction between the sheet and the first transparent guide 513 when the sheet is fed is suppressed, so that protection of the sheet and improvement in reading accuracy are realized. Incidentally, the thickness direction is a direction perpendicular to both the main scan direction (rotational axis direction of the first guiding roller 515) and the sub-scan direction, and is substantially the up-down direction in the through passage 430 in this embodiment. Further, a distance between the first guiding roller 515 and the first transparent guide 513 and a distance between the second guiding roller 516 and the first transparent guide 513 are substantially equal to each other.

The sheet fed along the through passage 430 by the upstream feeding roller pair 402 is subjected to reading of the back surface thereof by the back surface CIS 511 while being fed in a state in which the position of the sheet with respect to the thickness direction in restricted.

Further, each of the first guiding roller 515 and the second guiding roller 516 is disposed so that a part thereof projects toward the back surface CIS 511 side (lower side) than a nip line Np which is a common tangential line in the upstream nip N2 of a pair of rollers constituting the upstream feeding roller pair 402. By this, the sheet passing through the first reading position P1 is easily fed while contacting the first guiding roller 515, and a position of the sheet at the first reading position P1 with respect to a thickness direction, i.e., a position of the sheet with respect to a direction of depth of focus is stabilized, so that reading accuracy can be improved.

Incidentally, the front and rear registering portion 700 may also be constituted so that the distance Lg is capable of being adjusted in a range is not less than the thickness of the maximum thickness sheet capable of being fed by the image forming apparatus 100 (adjusting unit 400) and not more than the three times the thickness of the maximum thickness sheet. Further, the first transparent guide 513 is not limited to one provided separately from the back surface CIS 511, but for example, the first transparent guide 513 may also be formed, as a part of a casing for accommodating a sensor array, integrally with a casing of the back surface CIS 511.

Further, the first reading portion 500A is provided between the upstream feeding roller pair 402 and the back surface CIS 511 and includes a sheet detecting sensor S700 (FIG. 2) for detecting a leading end of the sheet fed along the through passage 430. When the leading end of the sheet reaches a position of an optical axis of the sheet detecting sensor S700 (FIG. 2), a detection signal is outputted from the sheet detecting sensor S700, so that sheet reading start timing is determined by the back surface CIS 511.

The second reading portion 500B includes a front surface CIS 521 as a third CIS, a second transparent guide 523 as a second light-transmissive plate, a fourth guiding roller 525 as a fourth roller, and a fifth guiding roller 526 as a fifth roller.

Constituent elements of the second reading portion 500B correspond to the constituent elements of the first reading portion 500A, respectively. Specifically, the front surface CIS 522 corresponds to the back surface CIS 511, and the second transparent guide 523 corresponds to the first transparent guide 513. Further, the fourth guiding roller 525 corresponds to the first guiding roller 515, and the fifth guiding roller 526 corresponds to the second guiding roller 516. These corresponding constituent elements between the first reading portion 500A and the second reading portion 500B not only have similar functions but also are disposed vertically symmetrically, and contents common to the first reading portion 500A and the second reading portion 500B will be omitted from description of the second reading portion 700B.

The front surface CIS 521 is a contact image sensor disposed downstream of the intermediary feeding roller pair 403 with respect to the feeding direction Y2 and above the through passage 430, i.e., on the upper surface (front surface, second surface) side of the sheet fed along the through passage 430. The front surface CIS 521 reads, from the upper surface of the sheet at the second reading position P2, the contour and image information of the sheet fed along the through passage 430 by the intermediary feeding roller pair 403. Incidentally, the second reading position P2 is specifically an optical axis position of the lens array 7c for guiding reflected light of the LED array 7a from the upper surface of the sheet, to the sensor array 7b of the front surface CIS 521.

The fourth guiding roller 525 is disposed opposed to the front surface CIS 521 while sandwiching the second transparent guide 523 on a side below the through passage 430, and is supported rotatably about a rotational axis C4 disposed along the main scan direction. This fourth guiding roller 525 is driven by the feeding motor 452 (FIG. 2) for reducing the friction resistance with the sheet, and is rotated in the R2 direction of part (a) of FIG. 4.

The fifth guiding roller 526 is disposed upstream of the fourth guiding roller 525 with respect to the feeding direction Y2 on the side below the through passage 430 and is supported rotatably about a rotational axis C5 disposed along the main scan direction. This fifth guiding roller 526 is driven by the feeding motor 452 and is rotated in the R2 direction in order to reduce the friction resistance with the sheet. The fourth guiding roller 525 and the fifth guiding roller 526 which are constituted as described above guide the sheet in contact with the lower surface of the sheet fed along the through passage 430. The sheet fed along the through passage 430 by the intermediary feeding roller pair 403 is subjected to reading of the front surface thereof by the front surface CIS 521 while being fed in a state in which the position of the sheet with respect to the thickness direction of the sheet is restricted by the fourth guiding roller 525 and the fifth guiding roller 526.

The sheet read by the first reading portion 500A and the second reading portion 500B is fed toward the branch portion 431 by the downstream feeding roller pair 404. Incidentally, in this embodiment, the roller pairs 401 to 405 are disposed so that extended nip lines thereof coincide with each other, but are not limited thereto, and may also be cross or parallel to each other without coinciding with each other. Further, each of the first, second, fourth and fifth guiding rollers may only be required that at least a part thereof is disposed on a side close to the reading means for reading the sheet than the nip line of the feeding roller pair disposed immediately before the feeding roller pair. For example, in the case where the nip line of the upstream feeding roller pair and the nip line of the intermediary feeding roller pair do not coincide with each other, the fourth guiding roller may only be required that at least a part thereof is disposed on the front surface CIS 521 side than the nip line of the intermediary feeding roller pair. Further, in a sheet feeding passage from the upstream feeding roller pair 402 to the downstream feeding roller pair 404, unshown rotatable members and unshown guiding members which are used for guiding the sheet may also be provided.

[Reading of Sheet and Feed-back of Reading Result]

Next, with reference to FIGS. 1, 2, 5 and 6, reading of the sheet by the front and back registering portion 700 and feed-back of a reading result will be described. The sheet library 900 (FIG. 2) held in the memory 302 by the printer controller 103 includes data in which a list of sheets usable as the recording material is stored by the image forming apparatus 100 in association with attribute information such as lengths in the sub-scan direction and the main scan direction and a basis weight. This sheet library 900 includes geometric adjusting values used when an image forming process is executed for each of the sheets. The geometric adjusting values are parameters for correcting a position of the image relative to the contour of the sheet, a magnification of the image, and the like.

As shown in part (a) of FIG. 5, the contents of the sheet library 900 can be checked by displaying a library display screen 1001 on the operating portion 180 (FIG. 1). When a user operates a "print position adjustment" button 1002 on the library display screen 1001, a correcting method selection screen 1003 of the geometric adjusting value shown in part (b) of FIG. 5 is displayed. In the case where the user selects a choice 1004 of "MANUALLY ADJUST", the user is capable of directly designating the geometric adjusting value by inputting numeric values with use of the numeric keys 181 (FIG. 1) provided on the operating portion 180.

On the other hand, in the case where the user selects a choice 1005 of "READ TEST PAGE AND ADJUST", the image forming system 100S (FIG. 1) executes a front and back registration process in which the front and back registration is performed on the basis of the reading result of the sheet. In the front and back registration process, the image forming apparatus 100 forms test patterns 820 (parts (a) and (b) of FIG. 6) for performing the front and back registration of the sheet. Further, in the front and back registration process, the front and back registering portion 700 (FIG. 1) of the adjusting unit 400 reads the sheet fed from the image forming apparatus 100 and feeds back a reading result to the image forming apparatus 100. The image forming apparatus 100 performs adjustment (correction) of the geometric adjusting value on the basis of the feed-back from the adjusting unit 400.

Specifically, when the front and back registration process is started, the image forming apparatus 100 in this embodiment feeds the sheet 1 from the sheet accommodating portion 113 accommodating sheets designated as an object to be subjected to the front and back registration process. Thereafter, the image forming apparatus 100 forms, on double surfaces (sides) of the sheet 1, the test patterns 820

(parts (a) and (b) of FIG. 6) including rectangular patch images disposed in the neighborhood of four corners of each of sheet surfaces by the image forming engine 102. After the formation of the test patterns 820, the image forming apparatus 100 discharges the sheet 1 toward the adjusting unit 400. The test patterns 820 are not limited to those constituted by a plurality of the rectangular patch images, but may also be those constituted by a plurality of square patch images. Further, each of the test patterns 820 may also be constituted by a so-called register mark (crossmark) which is a bleeding position mark or a folding position mark or by another shape image or by a combination of these marks or images. Further, a color or a density of the test pattern is not limited to uniform color or density, but the test pattern may also include patch images with a plurality of colors or a plurality of densities.

When the adjusting unit 400 receives the sheet 1 from the image forming apparatus 100, the adjusting unit 400 reads, as a line image, the front surface and the back surface of the sheet 1 by the front and rear registering portion 700 while feeding the received sheet 1 by the respective feeding roller pairs. Then, an image processing portion 460 (FIG. 2) of the adjusting unit 400 connects the read line images in the sub-scan direction (feeding direction of the sheet 1), so that image data of the front surface and the back surface of the sheet 1 containing the test patterns 820 are combined. Thus, the adjusting unit 400 reads image information of the test patterns 820 when the fed sheet 1 is read by the front and rear registering portion 700.

The image processing portion 460 of the adjusting unit 400 specifies a shape (contour) of the sheet 1, shapes (contours) of patch images formed on the sheet 1, and a positional relationship of these contours. Specifically, from the combined image data, with respect to the front surface and the back surface of the sheet 1, corner coordinates and coordinates of the patch images of the test patterns 820 are specified. As shown in parts (a) and (b) of FIG. 8, the corner coordinates of the sheet 1 represents four corner positions {(X01, Y01) to (X31, Y31) and (X02, Y02) to (X32, Y32)} of the sheet 1 when an X-axis is the main scan direction and a Y-axis is the sub-scan direction. Further, the coordinates of the test patterns 820 represents specific site positions {(X41, Y41) to (X71, Y71) and (X42, Y42) to (X72, Y72)} of the patch images in the same coordinate system as in the corner coordinate system.

From the corner coordinates, it is possible to geometrically calculate a length (short side length) (A) of the sheet 1 with respect to the main scan direction, a length (long side length) (B) of the sheet 1 with respect to the sub-scan direction, and perpendicularity of each of the corners, and the like, and therefore, it can be said that the corner coordinates include information on the shape (contour) of the sheet 1. Further, from the corner coordinates and the coordinates of the test patterns 820, it is possible to geometrically calculate positional deviation and distortion of the image relative to the contour of the sheet 1, and therefore, it can be said that the corner coordinates and the coordinates of the test patterns 820 include information on positions and distortion of the images relative to the sheet 1.

The image processing portion 460 further determines (calculates) geometric adjusting values for this sheet 1 by using the corner coordinates of the sheet 1 and the coordinates of the test patterns 820. For example, the image processing portion 460 determines a lead position, a side position, main scan magnification and sub-scan magnification as the geometric adjusting values. The lead position is a parameter for defining an image position relative to the sheet 1 with respect to the sub-scan direction. The side position is a parameter for defining the image position relative to the sheet 1 with respect to the main scan direction. The main scanning magnification is a parameter for defining magnification for magnifying or minifying the image data with respect to the main scan direction. Further, the sub-scan magnification is a parameter for defining magnification for magnifying or minifying the image data with respect to the sub-scan direction. The geometric adjusting values are determined so that distances ((c) to (j) in parts (a) and (b) of FIG. 6) from the test patterns 820 to ends (edges) of the sheet 1 are equal to preset values, respectively, in the case where correction of an image shape is made.

Incidentally, the four parameters consisting of the lead position, the sheet position, the main scan magnification and the sub-scan magnification are cited as the geometric adjusting values, but the image processing portion 460 may also calculate other parameters. As other parameters, for example, a parameter for correcting perpendicularity of the image, a parameter for making trapezoidal correction of the image, a parameter for defining an angle of rotation of the image relative to the sheet, and the like parameter would be considered.

The geometric adjusting values determined by the image processing portion 460 are sent to the printer controller 103 of the image forming apparatus 100 through a communicating portion 450 and are registered in the sheet library 900. In the case where the image forming apparatus 100 executes an image forming job, an image shape correcting portion 320 acquires pieces of sheet information 910, 911, 912, . . . (part (a) of FIG. 5) and geometric adjusting values of the sheet designated as the recording material by making reference to the sheet library 900. Then, the image shape correcting portion 320 corrects image data on the basis of the acquired geometric adjusting values for the sheet. The image data of the front surface and the back surface of the sheet are corrected, so that front and back registration of the sheet is carried out.

Incidentally, in this embodiment, the case where the test patterns 820 for front and back registration are formed on the basis of an explicitly instruction from the user and then the adjusting unit 400 acquires the geometric adjusting values was described, but the present invention is not limited thereto. For example, in the case where the image forming job is inputted, as a preparatory operation before the job is executed, the test patterns 820 are formed on the same sheet as the sheet designated in the job and then the geometric adjusting values may also be acquired. Further, during execution of an image forming job requiring a mass of products, a job for forming the test patterns 820 is automatically interposed every output of a certain number of sheets as the products and then correction (calibration) may also be made. The purpose of reading the sheet by the adjusting unit 400 is not limited to that the geometric adjusting values are acquired and then the positional deviation and distortion of the image relative to the sheet are corrected. For example, in order to monitor that the positional deviation and distortion of the image relative to the sheet fall within predetermined values, the adjusting unit 400 may also read the sheets on which product images are formed and which are continuously fed (reading of image information from the sheet).

[Control Method]

In the above-constituted image forming system 100S, a control method when feeding and reading of the sheet are carried out by the adjusting unit 400 will be described along a flowchart of FIG. 7 while making reference to the block diagram of FIG. 2 and schematic views of FIGS. 7 and 8.

In the following description, of the image forming job, a job which requires output of the product and in which the adjusting unit does not perform the reading of the sheet is referred to as a "normal job". Further, of the image forming job, a job in which the adjusting unit 400 performs the reading of the sheet by the front and rear registering portion 700 (FIG. 3) is referred to as a "front and back registration nip". Incidentally, the ordinary job is inputted to the printer controller 103 in the case where the ordinary job is inputted from an external computer via the external interface (I/F) 303 (FIG. 2) and the case where the user provides an instruction to start a copying operation through the operating portion 180 and in the like case. Further, the front and back registration job can be inputted in the case where the job is executed by the explicit instruction from the user and in the case where the image forming system 100S voluntarily executes the job, as described above.

When the image forming job is started (S1), the printer controller 103 discriminates whether the job is the normal job or the front and back registration job (S2). In the case of the normal job (S2: Y), the image forming apparatus 100 and the adjusting unit 400 cause members (for example, the flapper and the like) relating to the sheet feeding to stand by default positions (home positions). For example, the adjusting unit 400 positions the switching flapper 422 at a position for guiding the sheet to the first discharging opening 442 along the through passage 430 (part (a) of FIG. 8) (S4). That is, as shown in part (a) of FIG. 8, the switching flapper 422 is kept at an upward position.

The image forming apparatus 100 forms the image on the sheet 1 in accordance with the image data required to be outputted by the image forming job (S5), and the adjusting unit 400 receives the sheet 1 on which the image is formed (S6). Then, as shown in parts (a) and (b) of FIG. 8, the adjusting unit 400 delivers the sheet 1 successively by the respective feeding roller pairs and causes the sheet 1 to pass through the through passage 430. Then, the adjusting unit 400 discharges the sheet 1 by the outlet feeding roller pair 405 to the finisher 600 (FIG. 1) through the first discharging opening 442 (S7). When the finisher 800 receives the sheet 1, the finisher 600 subjects the sheet 1 to processing (treatment) by the processing portion 601, so that the processed sheet 1 is stacked as a product on a stacking tray 602.

In the case of the front and back registration job (S2: N), the adjusting unit 400 positions the switching flapper 422 at a position for guiding the sheet 1 to the discharging passage 432 (part (a) of FIG. 9) (S10). That is, as shown in part (a) of FIG. 9, the switching flapper 422 is kept at a downward position.

The image forming apparatus 100 forms the test patterns 820 for the front and back registration (parts (a) and (b) of FIG. 6) on the sheet 1 (S11), and the adjusting unit 400 receives the sheet 1 on which the test patterns 820 are formed (S12). The adjusting unit 400 causes the CISs 511 and 521 to read the sheet fed along the through passage 430 when the sheet 1 is passed through the reading positions P1 and P2 (FIG. 4) of the back surface CIS 511 and the front surface CIS 521 (S13, parts (a) and (b) of FIG. 9). Incidentally, before the test patterns 820 on the sheet 1 pass through the first reading position P1 of the back surface CIS 511, the controller 451 of the adjusting unit 400 may decelerate a feeding speed of the sheet 1 to a feeding speed suitable for reading of the sheet 1 by the CISs 511 and 521.

The image data read by the back surface CIS 511 and front surface CIS 521 are processed by the image processing portion 460, so that the geometric adjusting values are calculated. The calculated geometric adjusting values are sent to the image forming apparatus 100 via the communicating portion 450 and are stored in the sheet library 900 (S14).

When the sheet 1 passed through the reading positions P1 and P2 reaches the branch portion 431 from the through passage 430 toward the discharging passage 432, the adjusting unit 400 feeds the sheet 1, guided by the switching flapper 422, toward the second discharging opening 443 along the discharging passage 432. The adjusting unit 400 discharges the sheet 1, fed along the discharging passage 432, to the discharge tray 423 through the second discharging opening 443 (S15).

In order to perform the front and rear registration on the basis of an averaged geometric adjusting value, the above-described processes are repetitively executed for each of the sheets in the number of sheets designated in the job, and after the process for a final sheet is ended (S8: Y), the job is ended (S9). Incidentally, in a control example shown in FIG. 7, a kind of the job is discriminated every sheet during processing of the same job, but a constitution in which the kind of the job is discriminated at the time of the start of the job and in which the same process as the process for the last sheet is applied without discriminating the kind of the job during the processing of the job may also be employed. Further, in the control example shown in FIG. 7, the sheet is discharged to the discharge tray 423 after the sheet is read in the job for performing the front and back registration, but the present invention is not limited thereto. The image forming system 100S may also be capable of executing control such that the sheet 1 is discharged to the finisher 600 after the sheet is read in the job for performing the front and back registration. For example, a constitution in which the image forming apparatus 100 forms, on a sheet, an image as a product and test patterns disposed at a marginal portion of the sheet and discharges the sheet to the finisher 600 after the adjusting unit 400 reads the sheet and then the finisher 600 cuts the marginal portion including the test patterns from the sheet may also be employed.

[Details of Front and Rear Registering Portion]

Next, details of the front and rear registering portion 700 will be described with reference to FIGS. 4 and 10. In general, an image sensor of a 1:1 optical system, such as the contact image sensor used in this embodiment is characterized in that depth of focus is shallow (focus range is narrow) compared with a sensor of a reduction optical system, such as a CCD. For this reason, in order to suppress a change and variation in position of the sheet with respect to the depth of focus at the reading position of the sensor, the image reading apparatus using the image sensor of the 1:1 optical system is required that a dimension of a region, with respect to a sheet thickness direction, in which the sheet passes is made narrow. In other words, the image reading apparatus using the image sensor of the 1:1 optical system is required that a distance between a member for guiding the sheet in contact with the first surface of the sheet and a member for guiding the sheet in contact with the second surface of the sheet is made short.

However, for example, when a distance between a guiding member on the first surface side and a guiding member on the second surface side with respect to the thickness direction is made short in a long range with respect to the feeding direction, not only a frictional resistance of the sheet with each of the guiding members becomes large and thus a stable feeding speed cannot be obtained but also there is a liability that a jam of the sheet occurs. For this reason, the front and rear registering portion 700 in this embodiment restricts the position of the sheet with respect to the thickness direction in a narrow range with respect to the feeding direction Y2 by the guiding rollers 515 and 525 opposing the transparent guides 513 and 523 in the first reading position P1 and the second reading position P2, respectively.

Further, in general, in the image forming apparatus of the type such as an electrophotographic type in which heat is applied to the sheet when the image is formed on the sheet, the sheet is liable to cause warpage (curl) due to thermal expansion after image formation. Thus, when the sheet causing the warpage is fed, in a portion such as a portion between nips (adjacent feeding roller pairs) where the position of the sheet with respect to the thickness direction is not restricted, a part of the sheet is separated from a sheet feeding passage with respect to the sheet thickness direction in some cases. For example, in a state in which a leading end of the sheet is positioned between the upstream feeding roller pair 402 and the second guiding roller 516, the sheet is curved so as to be spaced from the through passage 430 in the thickness direction (upward direction) in some cases (part (a) of FIG. 10). Further, the leading end portion of the sheet fed in a state in which the warpage occurs is liable to contact a portion spaced from the first transparent guide 513 than a lower end portion of the second guiding roller 516, i.e., a closest portion to the first transparent guide 513 is (part (a) of FIG. 10).

In the case where the leading end portion of the fed sheet contacts the neighborhood of the lower end portion of the second guiding roller 516, the sheet is stably fed without receiving a large external force. However, when the leading end portion of the sheet contacts the portion of the second guiding roller 516 spaced from the first transparent guide 513, the sheet is liable to receive a large external force from the second guiding roller 516 with respect to a direction opposite to the feeding direction Y2. Further, thus, when the sheet receives the external force with respect to the direction opposite to the feeding direction Y2, the feeding speed (movement speed of the sheet leading end with respect to the feeding direction Y2) of the sheet changes (decreases) due to deceleration and vibration of the sheet by a curve (flexure) or the like of the sheet in some cases. Further, when the sheet feeding speed changes in a state in which the sheet reaches the reading position of the sensor for reading the image on the sheet, good reading accuracy of the sheet cannot be obtained in some cases.

Further, as described above, in the front and rear registering portion 700 in this embodiment, the sheet is not sandwiched between each of the first guiding roller 515 and the second guiding roller 516 and the first transparent guide 513. For this reason, when the sheet in a state in which a part thereof is spaced with respect to the thickness direction on a side upstream of the second guiding roller 516 enters between each of the first guiding roller 515 and the second guiding roller 516 and the first transparent guide 513, a curved portion of the sheet is rectified so as to follow the through passage 430 (parts (a) to (c) of FIG. 10). In other words, the portion of the sheet spaced from the first transparent guide 513 with respect to the thickness direction on the side upstream of the second guiding roller 516 moves so as to approach the first transparent guide 513. Further, when the curved portion of the sheet is rectified so as to follow the through passage 430, the leading end of the sheet changes (increases) in sheet feeding speed so as to move earlier than the sheet feeding speed by the upstream feeding roller pair 402 (FIG. 4). Also, in this case, similarly, when the sheet feeding speed changes in the state in which the sheet reaches the reading position of the sensor for reading the image, good reading accuracy of the sheet cannot be obtained in some instances.

In order to solve the above-described problem, the front and rear registering portion 700 in this embodiment improves the sheet reading accuracy by making the curved portion of the sheet easy to be rectified before the leading end of the sheet reaches the first reading position P1. In the following, behavior of the sheet causing the warpage in the front and rear registering portion 700 and a constitution in which the sheet reading accuracy is improved will be described with reference to parts (a) to (d) of FIG. 10.

As shown in part (a) of FIG. 10, when a leading end portion of a sheet 1' curved on a side upstream of the second guiding roller 516 reaches the second guiding roller 516, the sheet 1' contacts a portion (point 516') spaced from the second guiding roller 516 than a lower end portion of the second guiding roller 516 is. At this time, the sheet 1' receives an external force from the second guiding roller 516 with respect to the direction opposite to the feeding direction Y2 and the feeding speed (movement speed of a sheet leading end 1a with respect to the feeding direction Y2) of the sheet decreases in some cases. However, the leading end 1a of the sheet 1' at this time does not yet reach the first reading position P1, and therefore, there is no influence on the sheet 1' by the change in feeding speed of the sheet 1'.

When the sheet 1' is further fed and the leading end 1a thereof reaches the first reading position P1, the curve of the sheet 1' has already been rectified by the second guiding roller 516, so that the change in feeding speed of the sheet 1' is not readily caused by rectification of the curve of the sheet 1'.

Further, a distance between the first guiding roller 515 and the second guiding roller 516 with respect to the feeding direction Y2 is shorter than a distance between the second guiding roller 516 and the upstream feeding roller pair 402 with respect to the feeding direction Y2. That is, a distance L1 between a rotational axis (1 of the first guiding roller 515 and a rotational axis C2 of the second guiding roller 516 with respect to the feeding direction Y2 is shorter than a distance L2 between the rotational axis C2 and a rotational axis of the upstream feeding roller pair 402 with respect to the feeding direction Y2. Thus, the first guiding roller 515 and the second guiding roller 516 are disposed close to each other with respect to the feeding direction Y2, and suppress that the sheet causing the warpage is curved again between the first guiding roller 515 and the second guiding roller 516.

When the sheet 1' is further fed, as shown in part (d) of FIG. 10, the sheet 1' is read at the first reading position P1 with good reading accuracy while being fed at a stable speed. Incidentally, behavior of the sheet causing the warpage in the second reading portion 500B and a constitution in which the sheet reading accuracy is improved by providing the fifth guiding roller 526 are similar to those in the first reading portion 500A, and therefore, will be omitted from description.

Further in this embodiment, as the image reading apparatus, the adjusting unit 400 for reading the test patterns 820 for performing the front and back registration and reading the contour of the sheet was described, but the present invention is not limited thereto. The image reading apparatus may only be required to be provided with the reading means for reading the image information of the sheet fed while being nipped, and does not have to read the contour of the sheet and does not have to perform the front and back registration. For example, the image reading apparatus may also be provided with a color sensor as a reading means for reading color information (density information) of a test pattern (image) formed on the sheet in order to perform color (tint) adjustment, density adjustment and the like adjustment, and may also be capable of reading only the first surface of the sheet. Further, the image reading apparatus may also be an image reading apparatus provided for the purpose of converting contents into electronic data after reading a general image, an original or the like.

As described above, according to this embodiment, by the second guiding roller 516 disposed upstream of the first guiding roller 515 with respect to the feeding direction Y2, the curve (warpage) of the sheet can be rectified before the leading end of the sheet reaches the first reading position P1. further, the curve (warpage) of the sheet can be rectified before the leading end of the sheet reaches the second reading position P2. By this, reading accuracy of the sheet (image) at the first reading position P1 and the second reading position P2 can be improved.

Incidentally, in the adjusting unit 400 in this embodiment, the respective feeding roller pairs and guiding rollers disposed along the through passage 430 are driven by the feeding motor 452, but the present invention is not limited thereto. The image reading apparatus may also be an image reading apparatus including, as driving means for driving the above-described feeding roller pairs and guiding rollers, a plurality of motors capable of independently driving these rollers.

Further, in the adjusting unit 400 in this embodiment, a part of each of all the guiding rollers is disposed on the reading means side than the nip line Np is, but the present invention is not limited thereto. The image reading apparatus may only be required that at least guiding rollers opposing the reading means are provided on the reading means side than the nip line of the feeding roller pair provided immediately before the guiding rollers is.

Further, in the adjusting unit 400 in this embodiment, the first transparent guide 513 and the second transparent guide 523 are formed in flat plate shapes parallel to each other, but the present invention is not limited thereto. For example, the first transparent guide 513 and the second transparent guide 523 may also be formed so as to have curved surface contactable to the sheet and may also be disposed so as to cross each other, not so as to be parallel to each other.

Second Embodiment

In the following, a second embodiment will be described with reference to parts (a) and (b) of FIG. 11. The second embodiment is different from the first embodiment in constitutions of the first reading portion and the second reading portion of the front and rear registering portion, and other constitutions thereof are similar to those of the first embodiment. For this reason, constituent elements similar to those in the first embodiment are represented by the same reference numerals or symbols and will be omitted from description.

In the front and rear registering portion 700 in the first embodiment, as described above, the length of each of the back surface CIS and the front surface CIS as the reading means with respect to the main scan direction is not less than the width of the maximum size sheet feedable by the image forming apparatus 100 (adjusting unit 400).

On the other hand, in a front and rear registering portion 701 in this embodiment, for one side (surface), a plurality of reading means in which ha length of a reading range with respect to the main scan direction is less than the width of the maximum size sheet are provided, so that the maximum size sheet can be read.

Specifically, the front and rear registering portion 701 includes a first reading portion 501A for reading a contour and a lower surface of the sheet and a second reading portion 501B, provided downstream of the first reading portion 501A with respect to the feeding direction Y2, for reading a contour and an upper surface of the sheet. The first reading portion 501A includes a first back surface CIS 511a as a first contact image sensor and a second back surface CIS 512a as a second contact image sensor. Further, the first reading portion 501A includes a first guiding roller 515 as a first roller, a second guiding roller 516 as a second roller, and a third guiding roller 517 as a third roller.

The back surface CIS 511a and the second back surface CIS 512a are the contact image sensors are provided downstream of the upstream feeding roller pair 402 with respect to the feeding direction Y2 and below the through passage 430, i.e., provided on a lower surface side of the sheet fed along the through passage 430. A length L2 of a reading range of each of the first back surface CIS 511a and the second back surface CIS 512a with respect to the main scan direction (rotational axis direction of the first guiding roller 515) is less than the width of the maximum size sheet and is larger than ½ of the width of the maximum size sheet. for example, each of the first back surface BIS 511a and the second back surface CIS 512a is a sensor for reading an A4-size sheet of which length L3 is 210 mm or more. Specifically, the length L3 is about 220 mm.

Further, the first back surface CIS 511a and the second back surface CIS 512a are different from each other in positions with respect to the feeding direction Y2 and the main scan direction. Specifically, the second back surface CIS 512a is positioned not only on a side upstream of the first back surface CIS 511a with respect to the feeding direction Y2 but also on one side (X1-direction side) with respect to the main scan direction than the first back surface CIS 511a is. Further, the first back surface CIS 511a and the second back surface CIS 512a are disposed so that reading ranges thereof partially overlap with each other with respect to the main scan direction as seen in the feeding direction Y2 and so that a non-reading region in which the sheet cannot be read is not formed at a central portion with respect to the main scan direction. Thus, by disposing the CISs, for reading the A4-size sheet which has a large distribution amount and which is in expensive, at different positions with respect to the main scan direction in a shifted manner, for example, a sheet having a length of 13 inches with respect to the main scan direction, i.e., a so-called A3+-size sheet is capable of being read over an entire area.

Further, with respect to the main scan direction, a length L4 from one end of the reading range of the first back surface CIS 511a which does not overlap with the second back surface CIS 512a to the other end of the reading range of the second back surface CIS 512a which does not overlap with the first back surface CIS 511a is larger than the width of the maximum size sheet. In other words, the length L4 from one end (X1-direction end) to the other end (X2-direction end), with respect to the main scan direction, of a range in which the sheet is capable of being read by the first back surface CIS 511a and the second back surface CIS 512a is larger than the width of the maximum size sheet.

By employing such a constitution, the first reading portion 501a is capable of reading the maximum size sheet by using the first back surface CIS 511a and the second back surface CIS 512a each having a length of the reading range with respect to the main scan direction, which is less than the width of the maximum size sheet.

The second guiding roller 516 is disposed opposed to the second back surface CI 512a with respect to the first transparent guide 513 on a side opposite from the second back surface CIS 512a, and constitutes a background when the second back surface CIS 512a reads the contour of the sheet. The second guiding roller 516 is formed, along the main scan direction over an entire area of a range in which the second back surface CIS 512a is capable of reading the sheet, of a rubber or the like of a color low in brightness, such as black or grey, so as to clarify a contract with the sheet.

The third guiding roller 517 is disposed upstream of the second guiding roller 516 with respect to the feeding direction Y2 on a side above the through passage 430, i.e., on the same side as the second guiding roller 516. Further, the third guiding roller 517 opposes the first transparent guide 513 with a predetermined gap (Lg) in which the fed sheet is capable of passing, and restricts a position of the sheet, fed between itself and the first transparent guide 513, with respect to the thickness direction. The third guiding roller 517 performs a function similar to the function of the second guiding roller 516 in the second embodiment.

By employing such a constitution, in this embodiment, when the leading end of the sheet reaches the reading position of the second back surface CIS 512a, a curve of the sheet is rectified by the third guiding roller 517. for this reason, at the reading positions of the first back surface CI 511a and the second back surface CIS 512a, a change in sheet feeding speed does not readily occur.

The second reading portion 501B includes a first front surface CIS 521a as a third contact image sensor and a second front surface CIS 522a as a fourth contact image sensor. Further, the second reading portion 501B includes a fourth guiding roller 525 as a fourth roller, a fifth guiding roller 526 as a fifth roller, and a sixth guiding roller 527 as a sixth roller (rotatable member).

Constituent elements of the second reading portion 501B correspond to those of the first reading portion 501A. Specifically, the first front surface CIS 521a corresponds to the first back surface BIS 511a, and the second front surface CIS 522a corresponds to the second back surface CIS 512a. The fifth guiding roller 526 corresponds to the second guiding roller 516, and the sixth guiding roller 527 corresponds to the third guiding roller 517. These corresponding constituent elements between the first reading portion 501A and the second reading portion 501B have similar functions and are disposed vertically symmetrically, and contents common to the first reading portion 501A and the second reading portion 501B will be omitted from description.

Third Embodiment

In the following, a third embodiment will be described with reference to parts (a) and (b) of FIG. 12. The third embodiment is different from the first embodiment in constitutions of the first reading portion and the second reading portion of the front and rear registering portion, and other constitutions thereof are similar to those of the first embodiment. For this reason, constituent elements similar to those in the first embodiment are represented by the same reference numerals or symbols and will be omitted from description.

In a front and rear registering portion 702 in this embodiment, similarly as in the front and rear registering portion 701 in the second embodiment, for one side (surface), a plurality of reading means in which ha length of a reading range with respect to the main scan direction is less than the width of the maximum size sheet are provided, so that the maximum size sheet can be read.

The front and rear registering portion 702 in this embodiment includes a first reading portion 502A for reading a contour and a lower surface of the sheet and a second reading portion 502B, provided downstream of the first reading portion 502A with respect to the feeding direction Y2, for reading a contour and an upper surface of the sheet. The first reading portion 502A in this embodiment is different from the first reading portion 501A in the second embodiment in that the third guiding roller 517 is not provided, but other constitutions are similar to those of the first reading portion 501A in the second embodiment, and therefore, will be omitted from description. Further, the second reading portion 502B is different from the second reading portion 501B in the second embodiment in that the sixth guiding roller 527 is not provided and in that positions of the first and second front surface CISs are different from the positions of the first and second front surface CISs in the second embodiment, but other constitutions are similar to those of the second reading portion 501B in the second embodiment.

The second front surface CIS 522b is not only positioned on a side upstream of the first front surface CIS 521b with respect to the feeding direction Y2 but also is disposed at a position different from the position of the first front surface CIS 521b. Further, the first front surface CIS 521b and the second front surface CIS 522b are disposed so that reading ranges thereof partially overlap with each other with respect to the main scan direction as seen in the feeding direction Y2.

Further, with respect to the main scan direction, a length L4 from one end of the reading range of the second front surface CIS 522b which does not overlap with the first front surface CIS 521b to the other end of the reading range of the first front surface CIS 521b which does not overlap with the second front surface CIS 522b is larger than the width of the maximum size sheet. In other words, the length L4 from one end (X1-direction end) to the other end (X2-direction end), with respect to the main scan direction, of a range in which the sheet is capable of being read by the first front surface CIS 521b and the second front surface CIS 522b is larger than the width of the maximum size sheet.

By employing such a constitution, the second reading portion 502B is capable of reading the maximum size sheet by using the first front surface CIS 521b and the second front surface CIS 522b each having a length of the reading range with respect to the main scan direction, which is less than the width of the maximum size sheet.

Further, the first front surface CIS 521b is positioned on the other side (X2-direction side) with respect to the main scan direction than the second front surface CIS 522b is. Further, in the first reading potion 502A, the first back surface CIS 511a is positioned on one end side (X1-direction side) with respect to the main scan direction than the second back surface CIS 512a is. In other words, the first reading potion 502A and the second reading portion 502B are disposed so that the downstream CISs and the upstream CISs with respect to the feeding direction Y2 are positioned alternately on opposite sides (in a staggered arrangement with respect to the main scan direction.

As described above, the front and rear registering portion 702 in this embodiment is different from the front and rear registering portion 701 in the second embodiment and thus is not provided with the third guiding roller 517 and the sixth guiding roller 527. For this reason, in some cases, the sheet feeding speed changes when the leading end of the sheet reaches the reading positions of the second back surface CIS 512a and the second front surface CIS 522b, so that good reading accuracy cannot be obtained at the reading positions of the second back surface CIS 512a and 522b. In other words, in reading of the back surface of the sheet, reading accuracy on one side (X1-direction side) with respect to the main scan direction is higher than reading accuracy on the other side (X2-direction side) with respect to the main scan direction. In reading of the front surface of the sheet, the reading accuracy on the other side with respect to the main scan direction is higher than the reading accuracy on one side with respect to the main scan direction.

For example, assuming that a reading error by the downstream CIS is A μm (for example, 50 μm) at the maximum and a reading error by the upstream CIS is B μm (for example, 150 μm) at the maximum, a reading error by each of the first back surface CIS 511a and the first front surface CIS 521b is A μm at the maximum. Further, a reading error by each of the second back surface CIS 512a and the second front surface CIS 522b is B μm at the maximum. At this time, a reading error (deviation amount) between the front surface and the back surface on one side (X1-direction side) with respect to the main scan direction is a sum of the reading error by the first back surface CIS 511a and the reading error by the second front surface CIS 522b, and is (A+B) μm at the maximum. Further, a reading error between the front surface and the back surface on the other side (X2-direction side) with respect to the main scan direction is a sum of the reading error by the second back surface CIS 512a and the reading error by the first front surface CIS 521b, and is similarly (A+B) μm at the maximum. Specifically, the above-described reading error is a reading error of each of distances (D) and (H) from the associated test pattern 820 to the leading end of the sheet (FIG. 6).

Incidentally, assuming that the downstream CIS and the upstream CIS with respect to the feeding direction Y2 are positioned on the same side with respect to the main scan direction, a reading error between the front surface and the back surface on one side or on the other side is twice the B μm at the maximum (2*B>A+B).

Thus, the front and rear registering portion 702 in this embodiment suppresses a maximum value of the reading error between the front surface and the back surface by positioning the downstream CIS and the upstream CIS on opposite sides with respect to the main scan direction in each of the first reading portion 502A and the second reading portion 502B. Incidentally, in this embodiment, the second front surface CIS 522b is positioned on the X1-direction side than the first front surface CIS 521b is, and the second back surface CIS 512a is positioned on the X2-direction side than the first back surface CIS 511a is. In each of the first reading portion and the second reading portion, the downstream CIS and the upstream CIS with respect to the feeding direction Y2 may only be required on opposite sides with respect to the main scan direction, and for example, both the second back surface CIS 512a and the first front surface CIS 521b may also be positioned on the X1-direction side.

Fourth Embodiment

In the following, a fourth embodiment will be described with reference to parts (a) and (b) of FIG. 13. The fourth embodiment is different from the third embodiment in shapes of the first and second back surface CISs and the first and second front surface CISs, and other constitutions thereof are similar to those of the third embodiment. For this reason, constituent elements similar to those in the third embodiment are represented by the same reference numerals or symbols and will be omitted from description.

A first back surface CIS 511c as a first contact image sensor in this embodiment includes, as a part of outer configuration thereof, a projected portion 6b projecting in the feeding direction Y2. The projected portion 6b is provided with a connector portion 6c in which a flexible flat cable (FFC) for connecting the first back surface CIS 511c with the controller 451 (FIG. 2) is inserted.

In this embodiment, the first back surface CIS 511c, a second back surface CIS 512c, a first front surface CIS 521c, and a second front surface CIS 522c are different in arrangement from each other, but the same contact image sensor is used.

The first back surface CIS 511c and the second back surface CIS 512c are disposed so that projected portions 6b thereof are positioned on outsides with respect to the main scan direction. By disposing the CISs in such a manner, the first back surface CIS 511c and the second back surface CIS 512c are capable of being disposed close to each other with respect to the feeding direction Y2.

Further, similarly, the first front surface CIS 521c and the second front surface CIS 522c are disposed so that projected portions 6b thereof are positioned outsides with respect to the main scan direction. By disposing these CISs in such a manner, the first front surface CIS 521c and the second front surface CIS 522c are capable of being disposed close to each other with respect to the feeding direction Y2. By this, the front and rear registering portion 703 in this embodiment is capable of downsizing the apparatus with respect to the feeding direction Y2.

Incidentally, the adjusting unit 400 in the above-described embodiments was described by taking, as an example, a constitution in which the adjusting unit 400 is connected to the image forming apparatus 100 and reads the image on the sheet discharged from the image forming apparatus 100, but the present invention is not limited thereto. A constitution in which the adjusting unit 400 is accommodated in the image forming apparatus 100 may also be employed. That is, a constitution in which the image on the sheet fed from the image forming portion in the image forming apparatus is read by the adjusting unit 400 may also be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095101 filed on May 29, 2020, which is hereby incorporated by reference herein in its entirety.

What is claimed is:

1. An image reading apparatus connectable to an image forming apparatus, the image reading apparatus comprising:
a transparent member;
a feeding roller pair configured to nip and feed a sheet discharged from the image forming apparatus in a feeding direction;
a first reading unit configured to read through the transparent member at a first reading position an image on a first surface of the sheet fed by the feeding roller pair;
a second reading unit that is arranged at a position different from the first reading unit with respect to a width direction that is orthogonal to the feeding direction, the second reading unit being configured to read through the transparent member the image on the first surface of the sheet at a second reading position that is positioned upstream of the first reading position with respect to the sheet feeding direction;

a first roller disposed opposite to the first reading unit at the first reading position; and a second roller disposed opposite to the second reading unit at the second reading position.

2. An image reading apparatus according to claim 1, wherein a distance between the first roller and the second roller is shorter than a distance between the feeding roller pair and the second roller.

3. An image reading apparatus according to claim 1, wherein a part of the first roller and a part of the second roller are provided on a side closer to the first reading unit and the second reading unit than a common tangential line of the feeding roller pair in a nip of the feeding roller pair is to the first reading unit and the second reading unit.

4. An image reading apparatus according to claim 1, further comprising a feeding motor for rotating the first roller and the second roller.

5. An image reading apparatus according to claim 1, wherein a distance between the first roller and the transparent member and a distance between the second roller and the transparent member are greater than a thickness of a maximum thickness sheet feedable by the image reading apparatus.

6. An image reading apparatus according to claim 1, wherein a distance between the first roller and the transparent member and a distance between the second roller and the transparent member are substantially equal to each other.

7. An image reading apparatus according to claim 1, wherein a reading range of the first reading unit and a reading range of the second reading unit partially overlap with each other with respect to the width direction as seen in the sheet feeding direction.

8. An image reading apparatus according to claim 7, wherein with respect to the width direction, a length from one end of the reading range of the first reading unit that does not overlap with the second reading unit to the other end of the reading range of the second reading unit that does not overlap with the first reading unit is larger than a width of the maximum size sheet feedable by the image reading apparatus.

9. An image reading apparatus according to claim 1, further comprising a third roller positioned upstream of the second roller with respect to the sheet feeding direction and opposing the transparent member.

10. An image reading apparatus according to claim 1, wherein the transparent member is a first transparent member, wherein the image reading apparatus further comprises:
a second transparent member;
a third reading unit configured to read an image through the second transparent member on a second surface opposite from the first surface of the sheet at a third reading position positioned downstream of the first reading position with respect to the sheet feeding direction;
a fourth reading unit that is arranged at a position different from the third reading unit with respect to the width direction and configured to read through the second transparent member the image on the second surface of the sheet at a fourth reading position that is positioned upstream of the third reading position with respect to the sheet feeding direction;
a fourth roller disposed opposite to the third reading unit at the third reading position; and
a fifth roller disposed opposite to the fourth reading unit at the fourth reading position.

11. An image reading apparatus according to claim 10, wherein a reading range of the third reading unit and a reading range of the fourth reading unit partially overlap with each other with respect to the width direction as seen in the sheet feeding direction.

12. An image reading apparatus according to claim 11, wherein with respect to the width direction, a length from one end of the reading range of the fourth reading unit that does not overlap with the third contact image sensor to the other end of the reading range of the third reading unit that does not overlap with the fourth reading unit is greater than the width of a maximum size sheet feedable by the image reading apparatus.

13. An image reading apparatus according to claim 10, wherein the first reading unit is positioned more towards one end side of the width direction than the second reading unit is, and wherein the third reading unit is positioned more towards the other side of the width direction than the fourth reading unit is.

14. An image forming apparatus comprising:
an image forming unit configured to form an image on a sheet;
a transparent member;
a feeding roller pair configured to nip and feed the sheet discharged from the image forming unit in a feeding direction;
a first reading unit configured to read through the transparent member an image on a first surface of the sheet fed by the feeding roller pair;
a second reading unit that is arranged at a position different from the first reading unit with respect to a width direction that is orthogonal to the feeding direction, the second reading unit being configured to read through the transparent member the image on the first surface of the sheet at a second reading position that is positioned upstream of the first reading position with respect to the sheet feeding direction;
a first roller disposed opposite to the first reading unit at the first reading position; and
a second roller disposed opposite to the second reading unit at the second reading position.

15. An image forming apparatus according to claim 14, further comprising a controller configured to correct a position of the image relative to the sheet when the image is formed on the sheet, on the basis of information depending on the image read by the first reading unit and the second reading unit.

* * * * *